(12) United States Patent
Murakami et al.

(10) Patent No.: US 8,440,848 B2
(45) Date of Patent: May 14, 2013

(54) POLYORGANOSILOXANE COMPOSITION, CURED PRODUCT OF THE COMPOSITION, AND METHOD FOR PRODUCING THE COMPOSITION

(75) Inventors: Yasushi Murakami, Ueda (JP); Masami Kobayashi, Kawaguchi (JP); Takuya Kawashima, Ueda (JP); Wataru Shimizu, Ueda (JP); Shuhei Nakamura, Tsu (JP)

(73) Assignees: MIE University (JP); Japan Science and Technology Agency (JP); Shinshu University (JP)

( * ) Notice: Subject to any disclaimer, the term of this patent is extended or adjusted under 35 U.S.C. 154(b) by 199 days.

(21) Appl. No.: 13/128,509

(22) PCT Filed: Nov. 6, 2009

(86) PCT No.: PCT/JP2009/005906
§ 371 (c)(1),
(2), (4) Date: Jul. 21, 2011

(87) PCT Pub. No.: WO2010/055628
PCT Pub. Date: May 20, 2010

(65) Prior Publication Data
US 2011/0282086 A1    Nov. 17, 2011

(30) Foreign Application Priority Data

Nov. 13, 2008   (JP) ................................. 2008-291541

(51) Int. Cl.
*C07F 7/08*  (2006.01)
*C07F 7/02*  (2006.01)

(52) U.S. Cl.
USPC .............................. 556/10; 556/173; 556/443

(58) Field of Classification Search ................... 556/10, 556/173, 443
See application file for complete search history.

(56) References Cited

U.S. PATENT DOCUMENTS

| | | | |
|---|---|---|---|
| 5,783,609 A * | 7/1998 | Cho et al. | 521/47.5 |
| 6,511,754 B1 * | 1/2003 | Bohin et al. | 428/447 |
| 6,586,551 B2 * | 7/2003 | Bohin et al. | 528/15 |

FOREIGN PATENT DOCUMENTS

| | | |
|---|---|---|
| JP | 09241509 | 9/1997 |
| JP | 10-095852 A | 4/1998 |
| JP | 11323132 | 11/1999 |
| JP | 2000109560 | 4/2000 |
| JP | 2002080785 | 3/2002 |
| JP | 2002348380 | 12/2002 |
| JP | 2004210857 | 7/2004 |
| JP | 2004250665 | 9/2004 |
| JP | 2004252000 | 9/2004 |
| JP | 2005081669 | 3/2005 |
| JP | 2005209955 | 8/2005 |
| JP | 2005350639 | 12/2005 |
| JP | 2006002076 | 1/2006 |
| JP | 2008120054 | 5/2008 |
| JP | 2008231400 | 10/2008 |
| JP | 2008231402 | 10/2008 |

OTHER PUBLICATIONS

Jul. 27, 2012 Chinese Office Action, which is enclosed without an English Translation, that issued in Chinese Patent Application No. 200980154065.9.

* cited by examiner

*Primary Examiner* — Porfirio Nazario Gonzalez
(74) *Attorney, Agent, or Firm* — Cowan, Liebowitz & Latman, P.C.; Mark Montague, Esq.

(57) ABSTRACT

Disclosed is an organosiloxane composition which can be produced at low cost and is usable for bonding of glasses, metals and resins. The organosiloxane composition can provide a cured product exhibiting excellent heat resistance and cold resistance, while having high strength and high transparency. Specifically disclosed is a polyorganosiloxane composition containing (A) a polyorganosiloxane wherein at least one end of each molecule is modified with a silanol group, and (B) 0.5-4.0 moles of a metal alkoxide per 1 mole of the polyorganosiloxane, wherein the mean molecular weight (Mw) of the polyorganosiloxane according to the mass fraction is not more than 1,000. Also specifically disclosed are a cured product of the composition and a method for producing the composition.

10 Claims, 25 Drawing Sheets

1

POLYORGANOSILOXANE COMPOSITION, CURED PRODUCT OF THE COMPOSITION, AND METHOD FOR PRODUCING THE COMPOSITION

TECHNICAL FIELD

The present invention relates to a polyorganosiloxane composition, a cured product of the composition, and a method for producing the composition.

BACKGROUND ART

As polyorganosiloxane compositions exhibit excellent weather resistance and durability when they cured, they have been conventionally used as adhesives or sealing materials. Recently, cured products used the polyorganosiloxane compositions tend to be demanded to have higher strength. For example, polyorganosiloxane compositions containing fillers of inorganic or organic compounds are well known as compositions to respond to thus demand.

In addition, the kinds of materials of objects to be bonded (hereinafter referred to as "adherends") tend to increase, and the polyorganosiloxane compositions are widely used, for example, as elastic adhesives for products in the electric, electronic and automobile industries or as architectural sealing materials. With such tendencies, the compositions tend to be used in severer environments. For example, when the composition is applied to a portion near the engine of an automobile or to an architectural external material, various resistances, such as oil resistance, water resistance, heat resistance, and cold resistance, are required for the cured product of the composition. Compositions including a silicon-functional polyorganosiloxane; an alkoxy group or alkenyloxy group-containing cross-linking agent; an alkoxide of aluminum, titanium, or zirconium, a derivative thereof, a hydrolysis-condensation product thereof, or chelate compound; and a silicon compound including an imino group and an organo siloxy group are known as polyorganosiloxane compositions for responding to such requirements (see Patent Literature 1).

Furthermore, the storage stability of the polyorganosiloxane composition in an uncured state also tend to be valued, and a polyorganosiloxane compositions including a group having a β-diketoneoxy structure, an organosilicon compound, and a metal alkoxide like titanium alkoxide as a catalyst are known as polyorganosiloxane compositions showing the high storage stability and excellent adhesiveness to both a polyvinyl chloride steel sheet and a resin material (see Patent Literature 2).

CITATION LIST

Patent Literature

PTL 1: Japanese Patent Application Laid-Open H9-241509
PTL 2: Japanese Patent Application Laid-Open H11-323132

SUMMARY OF THE INVENTION

Problem to be Solved by the Invention

However, cured products of the above-described conventional polyorganosiloxane compositions have the following problems: Conventional polyorganosiloxane compositions that generate rubber elastic bodies by curing at room temperature, and cure by reaction with water in the air, have low storage stability because the alkoxy group is decomposed by a small amount of water such that alcohol generate during storage. In order to solve this problem, it is also known to use, as a catalyst for curing, a titanium alkoxide compound having good storage stability and excellent curing characteristic even if alcohol generate. However, the use of the titanium alkoxide compound causes a problem that adhesiveness to adherends like glass, metal, and regin is not sufficient. Furthermore, in the case of adding a cross-linking agent or a filler in the production process, there are problems that production at low cost is difficult to achieve and that the thickness of an adhesion layer cannot be decreased and also that transparency of the adhesive cannot be ensured in some types of cross-linking agents or fillers.

The present invention has been made in consideration of these problems, and it is an object thereof to provide an organosiloxane composition that gives a cured product being excellent in heat resistance and cold resistance and having high strength and high transparency, that can be also used for adhesion of glass, metals, and resins, and also that can be produced at low cost.

Means for Solving the Problem

In order to achieve the above-mentioned object, the present inventors have been dedicated to studying and, as a result, have succeeded in production of a polyorganosiloxane composition that gives a cured product being excellent in heat resistance and cold resistance and having high strength and high transparency and that can be also used for adhesion of glass, metals, and resins by mixing and stirring a polyorganosiloxane having a specific mass-average molecular weight (Mw) or less with a metal alkoxide at a specific molar ratio.

In more detail, an aspect of the present invention relates to a polyorganosiloxane composition containing: (A) a polyorganosiloxane in which at least one end of each molecule is modified with a silanol; and (B) a metal alkoxide in an amount of 0.5 to 4.0 moles relative to one mole of the polyorganosiloxane, wherein the polyorganosiloxane has a mass-average molecular weight (Mw) of 1000 or less.

Furthermore, another aspect of the present invention relates to the polyorganosiloxane composition further having an M-O—Si bond connecting between a metal (M) atom of the metal alkoxide and a silicon (Si) atom with an oxygen atom.

Furthermore, another aspect of the present invention relates to the polyorganosiloxane composition, wherein the metal alkoxide is a titanium alkoxide or an aluminum alkoxide.

Furthermore, another aspect of the present invention relates to the polyorganosiloxane composition, wherein the titanium alkoxide is titanium tetrapropoxide or titanium tetrabutoxide.

Furthermore, another aspect of the present invention relates to the polyorganosiloxane composition, wherein the aluminum alkoxide is aluminum tributoxide or aluminum triethoxide.

Furthermore, another aspect of the present invention relates to the polyorganosiloxane composition, wherein the molar ratio of the metal alkoxide to the polyorganosiloxane is 0.5 to 3.0.

Furthermore, another aspect of the present invention relates to the polyorganosiloxane composition, wherein the molar ratio of the metal alkoxide to the polyorganosiloxane is, in particular, 1.0 to 2.0.

Furthermore, another aspect of the present invention relates to a cured polyorganosiloxane product obtained by curing a polyorganosiloxane composition according to any one of above.

Furthermore, another aspect of the present invention relates to a method for producing a polyorganosiloxane composition by mixing a polyorganosiloxane in which at least one end of each molecule is modified with a silanol and having a mass-average molecular weight (Mw) of 1000 or less and a metal alkoxide in an amount of 0.5 to 4.0 moles relative to one mole of the polyorganosiloxane.

Furthermore, another aspect of the present invention relates to a method for producing a polyorganosiloxane composition, including the step of stirring the polyorganosiloxane and the metal alkoxide within a range in which the composition has an M-O—Si bond connecting between a metal (M) atom of the metal alkoxide and a silicon (Si) atom with an oxygen atom.

Effect of the Invention

According to the present invention, it is possible to provide an organosiloxane composition that gives a cured product being excellent in heat resistance and cold resistance and having high strength and high transparency that can be also used for adhesion of glass, metals, and resins, and also that can be produced at low cost, and provide a cured product thereof.

EMBODIMENT

Figure 1:
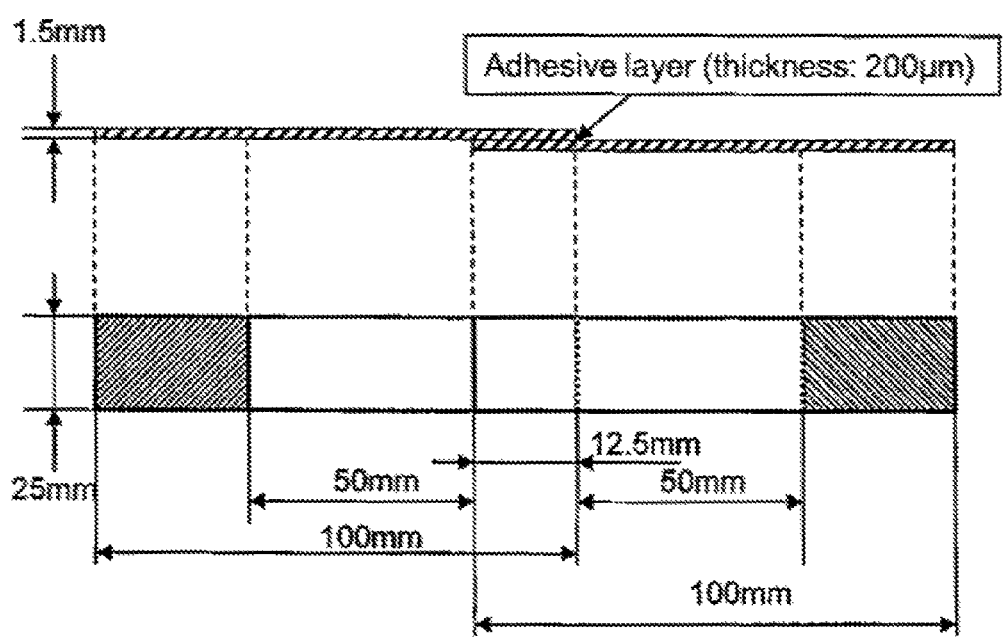
FIG. 1 shows a configuration of a test piece for evaluation of adhesion performance.

A preferred embodiment of the present invention will now be described.

The polyorganosiloxane composition according to this embodiment includes:

(A) a polyorganosiloxane in which at least one end of each molecule is modified with a silanol (silanol-terminated polyorganosiloxane); and (B) a metal alkoxide in an amount of 0.5 to 4.0 moles relative to one mole of the polyorganosiloxane, wherein the polyorganosiloxane has a mass-average molecular weight (Mw) of 1000 or less.

Furthermore, the polyorganosiloxane composition according to this embodiment is preferably a polyorganosiloxane composition having an M-O—Si bond connecting between a metal (M) atom of the metal alkoxide and a silicon (Si) atom with an oxygen atom.

The term "composition" in the present patent application means a material in a state before curing, such as a solution or a gel state.

The silanol-terminated polyorganosiloxane and the metal alkoxide will be described below.

1. Silanol-Terminated Polyorganosiloxane

The silanol-terminated polyorganosiloxane that can be used in this embodiment is represented by chemical formula (1) shown below. In this chemical formula, $R^1$ and $R^2$ are each independently a linear or branched alkyl group having 1 to 20 carbon atoms, a cycloalkyl group having 4 to 10 carbon atoms, or an aryl or aryl-substituted hydrocarbon group having 6 to 10 carbon atoms. Preferred examples of the linear or branched alkyl group having 1 to 20 carbon atoms include functional groups such as methyl, ethyl, n-propyl, i-propyl, n-butyl, i-butyl, s-butyl, t-butyl, pentyl, neopentyl, hexyl, heptyl, octyl, nonyl, decyl, undecyl, and dodecyl.

Furthermore, preferred examples of the cycloalkyl group having 4 to 10 carbon atoms include functional groups such as cyclopentyl and cyclohexyl. Furthermore, preferred examples of the aryl group or aryl-substituted hydrocarbon group having 6 to 10 carbon atoms include functional groups such as phenyl, toluoyl, xylyl, ethylphenyl, benzyl, and phenethyl. A particularly preferred silanol-terminated polyorganosiloxane is a polydimethylsiloxane modified with silanols at both ends.

[Chemical Formula 1]

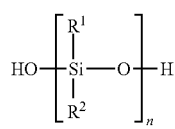

A smaller mass-average molecular weight (Mw) of the silanol-terminated polyorganosiloxane is desirable, but the Mw is preferably 1000 or less and more preferably 700 or less. Herein, the term "Mw" refers to an average of molecular weights by mass fractions ((the sum of $M_i^2 \cdot N_i$)/(the sum of $M_i \cdot N_i$), when the number of molecules having a molecular weight of $M_i$ is $N_i$. Incidentally, Mn is a value obtained by dividing the total mass by the number of molecules ((the sum of $M_i \cdot N_i$)/(the sum of $N_i$)), and Mw/Mn is a molecular weight distribution index.

2. Metal Alkoxide

Examples of the metal alkoxide include titanium alkoxides, aluminum alkoxides, tin alkoxides and the like. Examples of the titanium alkoxide include titanium tetraethoxide, titanium tetrapropoxide, titanium tetraisopropoxide, titanium tetrabutoxide, titanium tetraisobutoxide, titanium tetraisopropenyloxide and the like. In addition, oligomers thereof also can be used. Particularly preferred examples of the titanium alkoxide are titanium tetraisopropoxide, titanium tetraethoxide, and titanium tetrabutoxide.

The amount of the titanium alkoxide contained in the composition is in a range of 0.5 to 4 moles, preferably in a range of 0.5 to 3 moles, and more preferably in a range of 1 to 2 moles relative to one mole of the polyorganosiloxane. If the amount of the titanium alkoxide is too small, a Ti—O—Si bond tends to be hardly formed. On the other hand, if the amount is too large, the titanium alkoxide interferes with adhesion between the polyorganosiloxane and a substrate as an adherend.

Examples of the aluminum alkoxide include aluminum triethoxide, aluminum tripropoxide, and aluminum tributoxide. In addition, oligomers thereof also can be used. Particularly preferred examples of the aluminum alkoxide are aluminum tributoxide and aluminum triethoxide. The amount of the aluminum alkoxide contained in the composition is in a range of 0.5 to 4 moles, preferably in a range of 0.5 to 3 moles, and more preferably in a range of 1 to 2 moles relative to one mole of the polyorganosiloxane. If the amount of the aluminum alkoxide is too small, an Al—O—Si bond tends to be hardly formed. On the other hand, if the amount is too large, the aluminum alkoxide interferes with adhesion between the polyorganosiloxane and a substrate as an adherend.

Examples of the tin alkoxide include tin tetraethoxide, tin tetrapropoxide, and tin tetrabutoxide. In addition, oligomers thereof also can be used. A particularly preferred example of the tin alkoxide is tin tetrabutoxide. The amount of the tin alkoxide contained in the composition is in a range of 0.5 to 4 moles, preferably in a range of 0.5 to 3 moles, and more preferably in a range of 1 to 2 moles relative to one mole of the polyorganosiloxane.

Next, a method for producing the polyorganosiloxane composition will be described.

3. Method for Producing a Polyorganosiloxane Composition

A silanol-terminated polyorganosiloxane and a metal alkoxide are introduced into a container at a molar ratio of the polyorganosiloxane to the metal alkoxide of 1:0.5 to 4, followed by stirring at a predetermined temperature within a range of 10 to 50° C. Either a closed atmosphere or an open atmosphere can be selected as the atmosphere for the stirring. The stirring in an open atmosphere may be performed in the air, but is preferably performed in an inert gas atmosphere, such as a nitrogen gas or an argon gas. The stirring rate in the case using a rotating machine is in a range of 10 to 2000 rpm, preferably 50 to 1000 rpm, and more preferably 200 to 700 rpm. The stirring time is preferably within a range not longer than 120 hours, in particular, preferably within 100 hours, and more preferably from 24 to 72 hours. When the metal alkoxide is an aluminum alkoxide, an Al—O—Si bond is present in the polyorganosiloxane composition regardless of the length of stirring time. However, when the metal alkoxide is a titanium alkoxide, the Ti—O—Si bond tends to be eliminated from the polyorganosiloxane composition if the stirring time is too long. Therefore, when the titanium alkoxide is used as the metal alkoxide, the optimum stirring time is 24 hours. On the other hand, when an aluminum alkoxide is used, the need to limit the stirring time is relatively low, but the optimum stirring time is 72 hours from the need of reliably producing an adhesive in a solution state. The stirring may be performed by a method using, for example, a stirrer having a stirring blade or a magnetic stirrer or a method involving providing vibration using a sonicator.

Next, a method for producing a cured product of the polyorganosiloxane composition will be described.

4. Method for Producing Cured Product of Polyorganosiloxane Composition (Polyorganosiloxane Cured Product)

The polyorganosiloxane cured product is formed by heating the polyorganosiloxane composition at a temperature of 20° C. or higher to accelerate polymerization. The heating temperature is more preferably 60 to 200° C., further more preferably 80 to 180° C.

The adherend as an object to be bonded is preferably, for example, glass, metal, resin, or ceramic. In particular, preferred examples of the metal adherend include aluminum, iron, stainless steel, titanium, and copper. In the case of iron or copper which tends to form an oxide layer on the surface thereof, the adhesive strength further increases by removing the oxide layer and then curing an adhesive on the surface. Regarding the resin adherends, for example, polyether ether ketone (PEEK) resins, polypropylene (PP) resins, polyvinyl chloride (PVC) resins, and acrylic (PMMA) resins are preferred. In every resin, the adhesive strength increases by subjecting the adherend surface to corona treatment and then curing an adhesive on the surface.

The cured product of a polyorganosiloxane including a titanium alkoxide or an aluminum alkoxide as the metal alkoxide is excellent in thermal stability after adhesion and can maintain the stable adhesion state at least for 200 hours at heating temperature of up to 250° C. The cured product is most excellent in thermal stability when the adherend is glass.

The cured product of a polyorganosiloxane including a titanium alkoxide or an aluminum alkoxide is excellent in transparency, showing a transmittance of approximately 100% when the transmittance of glass as an adherend to which the cured product adhering is measured with, for example, an UV-Vis. Accordingly, the polyorganosiloxane composition is useful as a transparent adhesive.

EXAMPLES

Examples of the present invention will be described below, but the present invention is not limited to the following examples.

1. Silanol-Terminated Polydimethylsiloxane-Titanium Alkoxide System

Experiment 1: Investigation of Ti—O—Si bond

In a glove box through which dry nitrogen gas flowed in and out, 3.688 g of a silanol-terminated polydimethylsiloxane (manufactured by Gelest, Inc., hereinafter referred to as "PDMS") having an Mw of 590 when actually measured by GPC (nominal Mw: 400 to 700, hereinafter referred to as Mw=590); 3.553 g of titanium tetraisopropoxide (TTIP, manufactured by Kanto Chemical Co., Ltd., PDMS: TTIP=1:2 as a molar ratio); and a stirrer chip were introduced into a glass container having a lid (capacity: 50 mL, a vial with screw), followed by stirring with a magnetic stirrer for 144 hours in an incubator maintained at 25° C. The stirring rate was set to 550 rpm. The solution changed from being transparent to being clouded with the progress of the stirring. The transparent solution at a stage of the stirring for a short period of time and the clouded solution at a stage of the stirring for a long period of time (120 hours or longer in this experiment) were sampled as polyorganosiloxane compositions for evaluation of adhesive strength of each cured product. Each polyorganosiloxane composition was subjected to identification of bond using a Fourier transform infrared spectrophotometer (IR Prestige-21, manufactured by Shimadzu Corp., attachment: Durasmpll II, manufactured by Smith, hereinafter referred to as "FT-IR").

FIG. 1 shows a configuration of a test piece for evaluation of adhesion performance. The upper drawing is a side view of the test piece, and the lower drawing is a plan view of the test piece.

Two aluminum plates each having a width of 25 mm, a length of 100 mm, and a thickness of 1.5 mm were prepared, and, as shown in FIG. 1, an adhesive of any of the above-described polyorganosiloxane compositions (those stirred for 24 hours, 72 hours, 120 hours, or 144 hours) was applied to the end adhesive region (width: 25 mm, length: 12.5 mm, area: 312.5 mm$^2$) of each aluminum plate, and the adhesive was cured in the state disposed between the two aluminum plates. Each adhesive was used together with glass beads having an average particle diameter of 200 μm as a spacer, thereby, all adhesive layers equally having a thickness of about 200 μm.

The curing was performed by increasing the temperature to 80° C. at a heating rate of 10° C./min, keeping 80° C. for 6 hours, increasing the temperature to 105° C. at the same heating rate as above, keeping 105° C. for 12 hours, increasing the temperature to 180° C. at the same heating rate as above, and keeping 180° C. for 12 hours, followed by natural cooling. After cooling, the test piece was fixed at both ends (end regions each having a width of 25 mm and a length of 50 mm) and was stretched at a tension rate of 5 mm/min in opposite directions using an RTC Tensilon universal tester, RTC250A, manufactured by A&D Co., in accordance with JIS K6251. Hereinafter, the tension rate in subsequent evaluation of adhesion performance was set to this rate.

Figure 2:
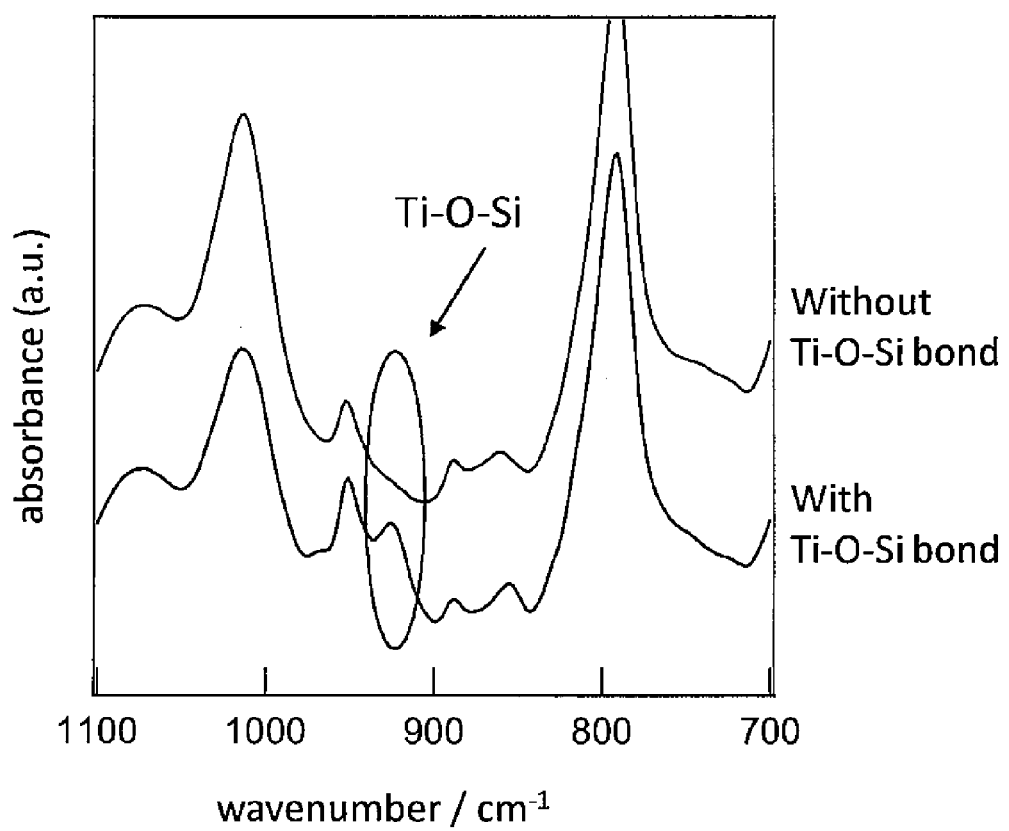
FIG. 2 shows results of FT-IR, showing a Ti—O—Si bond at approximately 900 to 950 $cm^{-1}$ in each polyorganosiloxane composition in Experiment 1.
Figure 3:
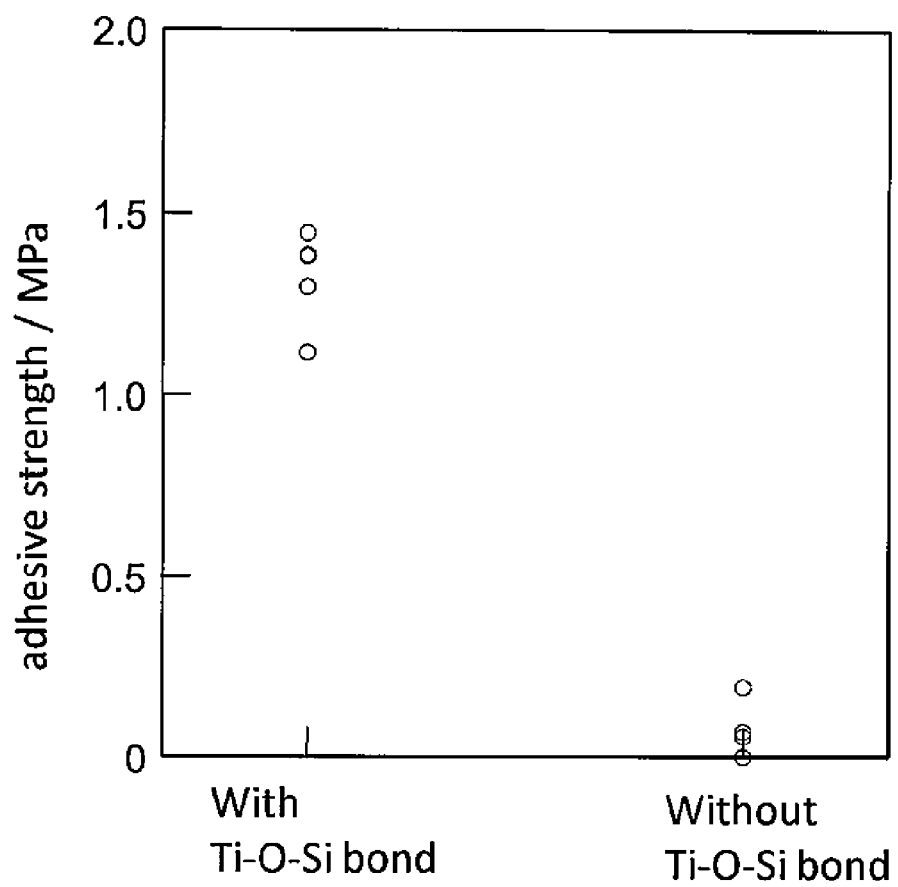
FIG. 3 shows the adhesive strength of a cured product used each polyorganosiloxane composition in Experiment 1.

FIGS. 2 and 3 show a Ti—O—Si bond at approximately 900 to 950 cm$^{-1}$ in each polyorganosiloxane composition and the adhesive strength of each cured product used each composition, respectively.

As shown in FIG. 2, a peak showing the Ti—O—Si bond was confirmed in the polyorganosiloxane composition having high transparency sampled at a stage of the stirring for a short period of time, whereas no peak showing the Ti—O—Si bond was confirmed in the polyorganosiloxane composition in a clouded state sampled at a stage of the stirring for a longer period of time. Furthermore, as shown in FIG. 3, the adhesive strength of cured product used the polyorganosiloxane composition with the Ti—O—Si bond was higher than that of the cured product used the polyorganosiloxane composition without the bond. It is conceivable from this result that there is a possibility that the adhesive strength of a cured product relates the number of Ti—O—Si bonds in the polyorganosiloxane composition in an uncured state.

Experiment 2: Investigation of Mw of Polyorganosiloxane

Polyorganosiloxane compositions were prepared using five types of PDMSs: Mw=590, 1000 (manufactured by Shin-Etsu Chemical Co., Ltd.), 2000 to 3500 (manufactured by Gelest, Inc.), 3000 (manufactured by Shin-Etsu Chemical Co., Ltd.), and 4200 (manufactured by Alfa Aesar), and TTIP and by stirring for 24 hours. Preparation conditions other than the stirring time were the same as those in Experiment 1. Then, five types of the polyorganosiloxane compositions in total were each applied as an adhesive between two aluminum plates, followed by curing, under the same conditions as those in Experiment 1.

Figure 4:
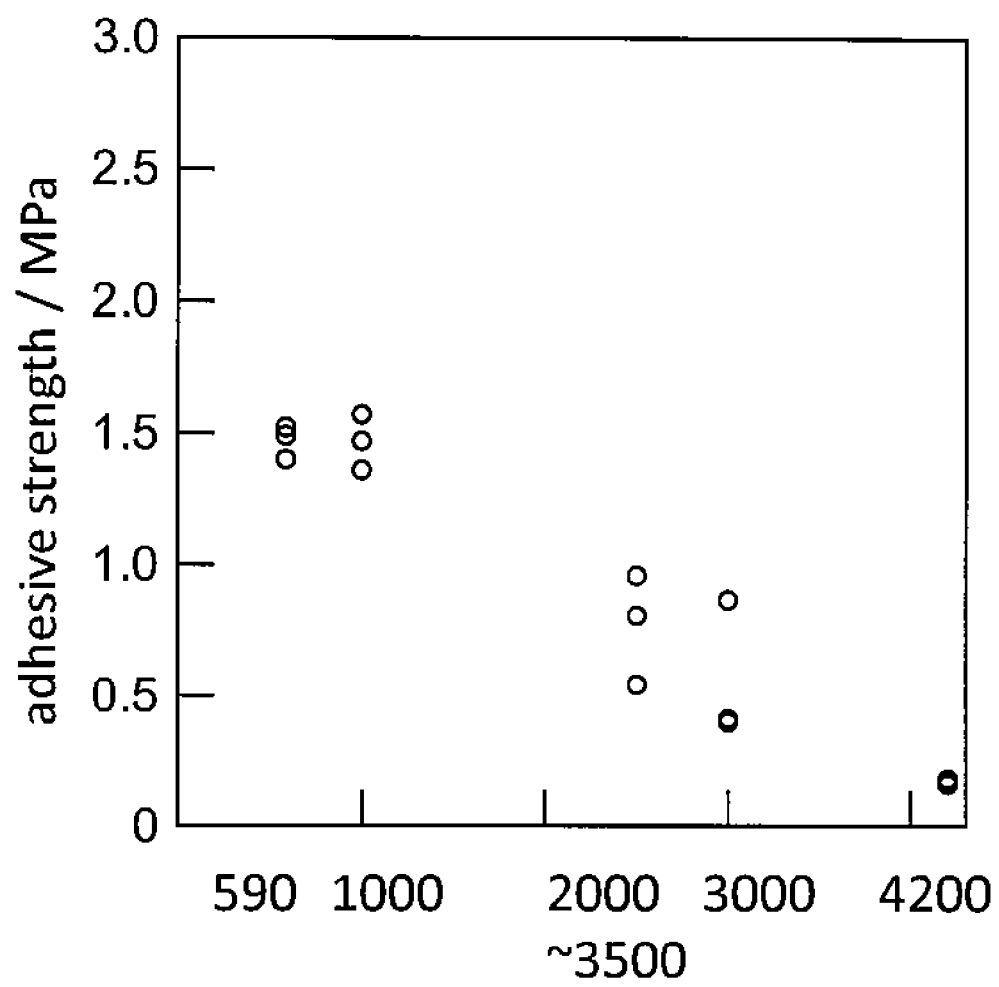
FIG. 4 shows a relationship between Mw of PDMS in each polyorganosiloxane composition and adhesive strength of a cured product used each composition in Experiment 2.

FIG. 4 shows the adhesive strength of the cured product used each polyorganosiloxane composition.

As shown in FIG. 4, a PDMS having a Mw of 1000 or less led to a particularly high adhesive strength and the adhesive strength decreased with an increase in Mw in the range of Mw higher than 1000. An increase in Mw of PDMS tends to make difficult to cure the polyorganosiloxane composition when it cures. It is conceivable from the results that the high level of adhesive strength of a cured product depends on easiness of curing due to the smaller Mw of the PDMS.

Experiment 3: Investigation of Adherend Selectivity

"No. 1"

A polyorganosiloxane composition was prepared using PDMS of Mw=590 and TTIP and by stirring for 24 hours. Other preparation conditions were the same as those in Experiment 1. The polyorganosiloxane composition was applied as an adhesive under the same conditions as in Experiment 1 between two glass plates, two Fe plates, two SUS plates, two Ti plates, and two Cu plates, followed by curing. The glass plates, the Fe plates, the SUS plates, the Ti plates, and the Cu plates serving as the adherends were used in the same configuration as that of the aluminum plates used in Experiment 1. Five test pieces were prepared for each type of the adherends (each referred to as Samples 1 to 5).

TABLE 1

|  | Glass Plate | Fe Plate | SUS Plate | Ti Plate | Cu Plate |
|---|---|---|---|---|---|
| Sample 1 | ○ | x | 1.36 | 0.776 | 1.13 |
| Sample 2 | ○ | x | x | 1.28 | 0.563 |
| Sample 3 | ○ | x | 1.07 | 0.757 | x |
| Sample 4 | ○ | 1.29 | 1.4 | 1.55 | x |
| Sample 5 | ○ | 0.544 | 0.615 | 1.17 | 1.11 |
| Ave. |  | 0.917 | 1.111 | 1.107 | 0.934 |

(N/mm2)

Table 1 shows tensile-shear test results of the test pieces of each type of the adherends. In Table 1, the circle mark means that the strength could not be measured because of breakage of the substrate before the measurement. The cross mark means that the adhesive strength could not be measured because of detachment of the substrate at the interface with the cured product before the strength test. The units of the numerical values in the table are N/mm$^2$.

As shown in Table 1, the adhesive of the polyorganosiloxane composition showed a significantly high adhesive strength to the glass plates, so that the glass plates themselves were broken before breakage of the cured product of the composition or detachment of the glass plate at the interface with the cured product. After applying the adhesive between two glass plates and curing, the light transmittance was measured by UV-Vis using UV-2100 manufactured by Shimadzu Corp. As a result, the value of the light transmittance was 100%. It was confirmed that the adhesive of the composition effectively functioned to the Ti plates and the SUS plates, but in the Fe plates and the Cu plates, a phenomenon that a substrate is detached at the interface with a cured product was observed before the strength test in two or three test pieces, and it was confirmed that a sufficient adhesive function was not achieved.

"No. 2"

Then, the Fe plates and the Cu plates were subjected to surface treatment with a solution of 5% ens acid in order to remove the oxide layer on adherend surface. In addition to the surface-treated Fe plates and Cu plates, the glass plates, the SUS plates, and the Ti plates used above, and separately prepared Al plates, i.e., six types of adherends in total were subjected to an adhesive strength test. The preparation conditions of the polyorganosiloxane composition and the application and curing conditions of the adhesive were the same as those in "No. 1". Three test pieces were prepared for each type of the adherends (each referred to as Samples 1 to 3).

TABLE 2

|  | Glass Plate | Al Plate | Fe Plate | SUS Plate | Ti Plate | Cu Plate |
|---|---|---|---|---|---|---|
| Sample 1 | ○ | 1.49 | 0.857 | 1.227 | 1.167 | 1.19 |
| Sample 2 | ○ | 1.4 | 1.07 | 1.364 | 1.282 | 1.356 |
| Sample 3 | ○ | 1.52 | 1.187 | 1.404 | 1.548 | 1.587 |
| Ave. |  | 1.47 | 1.038 | 1.332 | 1.332 | 1.378 |

(MPa)

Figure 5:
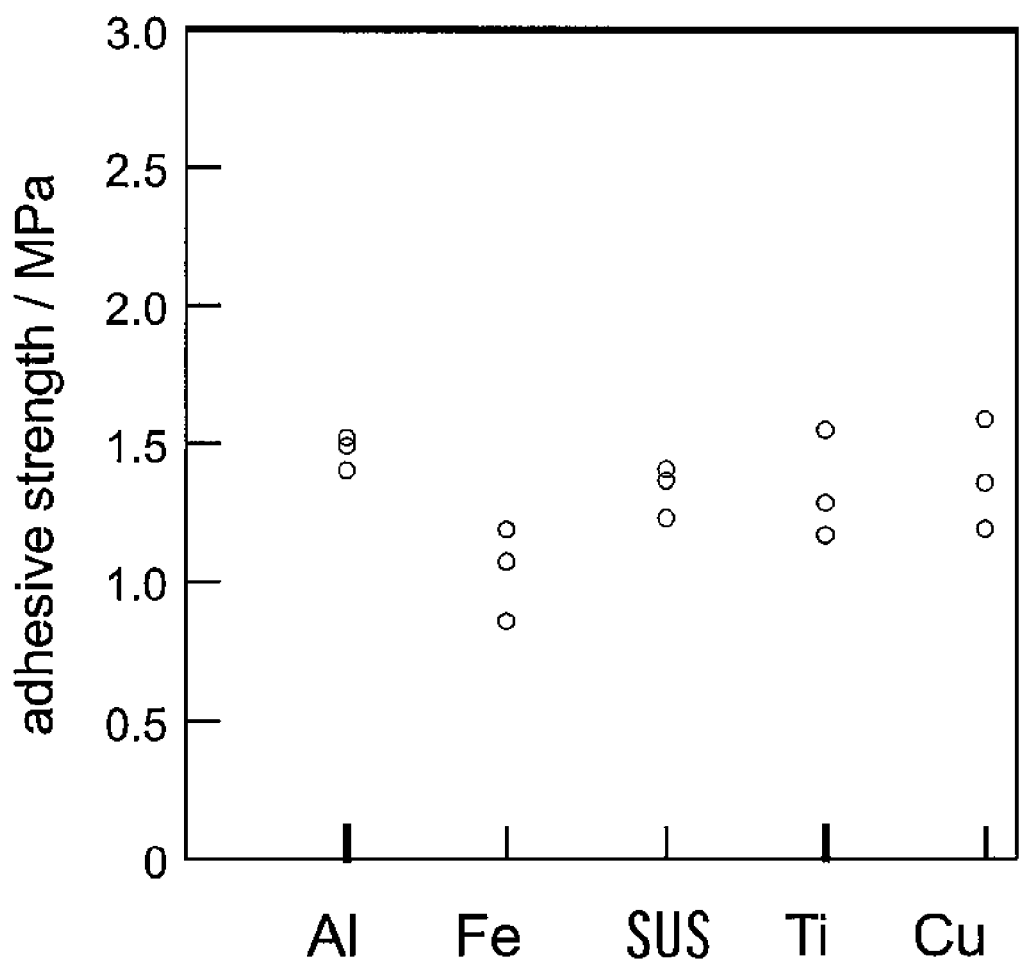
FIG. 5 shows tensile-shear test results of the test pieces of each type of metal adherends in Experiment 3 (No. 2).

Table 2 and FIG. 5 show the tensile-shear test results of the test pieces of each type of the adherends. In Table 2, the circle mark means that the strength could not be measured because of breakage of the substrate before the measurement. The units of the numerical values in the table are MPa.

As shown in Table 2, the adhesive of the polyorganosiloxane composition showed a significantly high adhesive strength to the glass plates, so that the glass plates themselves were broken before breakage of the cured product of the composition or detachment of the glass plate at the interface with the cured product. As shown in Table 2 and FIG. 5, the adhesive showed high strength to the Fe plates and the Cu plates when the oxide layers were removed therefrom, unlike the results in the adhesive strength test shown in Table 1. It was confirmed that this adhesive of the polyorganosiloxane composition showed high adhesion performance to all metals used in the test.

Experiment 4: Investigation of Adhesiveness to Organic Substrate

"No. 1"

A polyorganosiloxane composition was prepared using PDMS of Mw=590 and TTIP and by stirring for 24 hours. Other preparation conditions were the same as those in Experiment 1. The polyorganosiloxane composition was applied as an adhesive under the same conditions as those in Experiment 1 between two epoxy plates, two PEEK plates, two PC plates, two POM plates, and two PP plates. The curing conditions (heating conditions) of the adhesive were changed in view of the heat resistance of each substrate. Specifically, the curing in the cases of the epoxy plates and the PEEK plates was performed by increasing the temperature to 80° C. at a heating rate of 10° C./min, keeping 80° C. for 6 hours, increasing the temperature to 105° C. at the same heating rate as above, keeping 105° C. for 12 hours, increasing the temperature to 150° C. at the same heating rate as above, and keeping 150° C. for 12 hours, followed by natural cooling. The curing in the cases of the PC plates, the POM plates, and the PP plates was performed by increasing the temperature to 80° C. at a heating rate of 10° C./min, keeping 80° C. for 6 hours, increasing the temperature to 120° C. at the same heating rate as above, and keeping 120° C. for 72 hours, followed by natural cooling. Each substrate serving as the adherend was used in the same configuration as that of the aluminum plates used in Experiment 1. Two test pieces were prepared for each type of the adherends (each referred to as Samples 1 and 2).

TABLE 3

|  | Epoxy Plate | PEEK Plate | PC Plate | POM Plate | PP Plate |
|---|---|---|---|---|---|
| Sample 1 | ○ | ○ | ○ | x | x |
| Sample 2 | ○ | ○ | ○ | x | x |

Table 3 shows the tensile test results of the test pieces of each type of the adherends. In Table 3, the circle mark means that adhesive strength was high, and the cross mark means that adhesion did not occur.

As shown in Table 3, the adhesive of the polyorganosiloxane composition showed significantly high adhesive strengths to the epoxy plates, the PEEK plates, and the PC plates, but did not show adhesiveness to the POM plates and the PP plates. It is conceivable from the results that this adhesive also has adherend selectivity to resin plates.

"No. 2"

A polyorganosiloxane composition was prepared under the same preparation conditions as those in the above-described "No. 1", and other preparation conditions were the same as those in Experiment 1. The polyorganosiloxane composition was applied as an adhesive under the same conditions as in Experiment 1 between two polyether ether ketone resin plates (referred to as PEEK plates), two polypropylene resin plates (referred to as PP plates), two polyvinyl chloride resin plates (referred to as PVC plates), and two acrylic plates (referred to as PMMA plates). In addition, samples for investigating the effect of corona treatment to the adherend surface were prepared by subjecting the adherend surface of each plate to corona treatment and then applying the adhesive to the surface. The corona treatment was performed by exposing each adherend to a flame with a distance of about 5 mm from the surface of the adherend for 10 seconds. The curing conditions (heating conditions) of the adhesive were the same regardless of whether or not the corona treatment was performed, and in view of the heat resistance of each substrate, the curing in the case of the PEEK plates was performed by increasing the temperature to 80° C. at a heating rate of 10° C./min, keeping 80° C. for 6 hours, increasing the temperature to 105° C. at the same heating rate as above, keeping 105° C. for 12 hours, increasing the temperature to 150° C. at the same heating rate as above, and keeping 150° C. for 12 hours, followed by natural cooling. In the case of the PP plates, the curing was performed by increasing the temperature to 80° C. at a heating rate of 10° C./min, keeping 80° C. for 6 hours, increasing the temperature to 120° C. at the same heating rate as above, and keeping 120° C. for 72 hours, followed by natural cooling. In the cases of the PVC plates and the PMMA plates, the curing was performed by increasing the temperature to 60° C. at a heating rate of 10° C./min, and keeping 60° C. for 168 hours, followed by natural cooling. Each substrate serving as the adherend was used in the same configuration as that of the aluminum plates used in Experiment 1. Three test pieces were prepared for each type of the adherends (each referred to as Samples 1 to 3).

Figure 6:
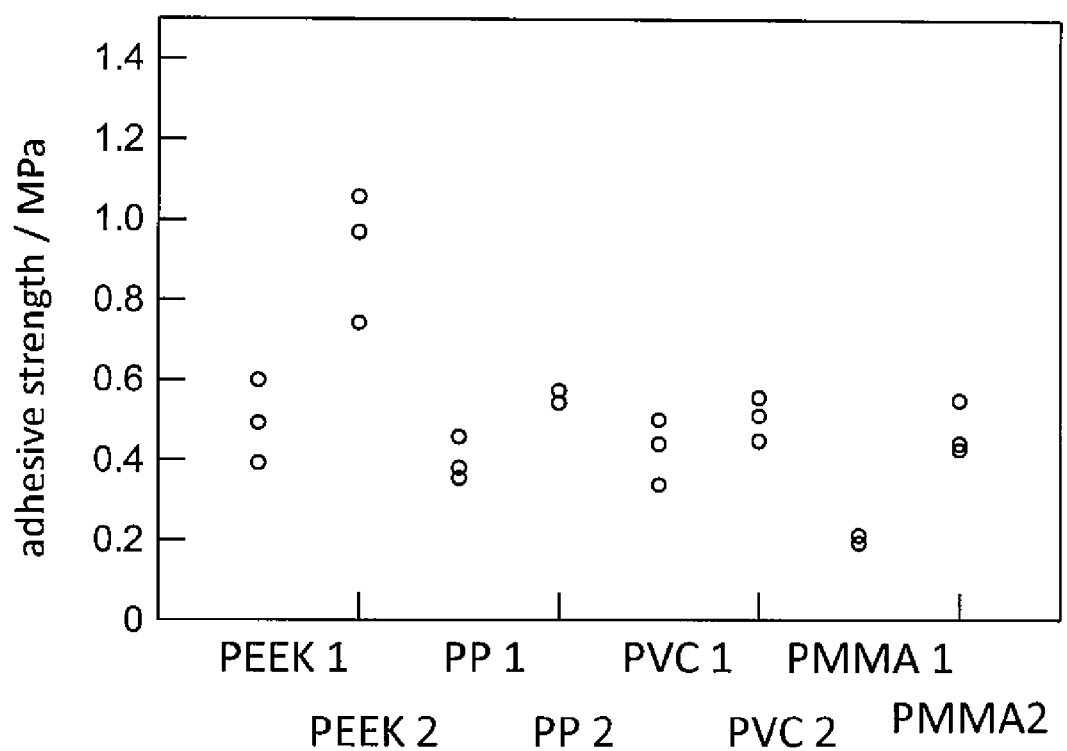
FIG. 6 shows tensile test results of the test pieces of each type of resin adherends in Experiment 4 (No. 2).

FIG. 6 shows the tensile test results of the test pieces of each type of the adherends. In FIG. 6, test pieces without the corona treatment are shown with "1" at the end of the material name, such as "PEEK1", and test pieces with the corona treatment are shown with "2" at the end of the material name, such as "PEEK2".

As shown in FIG. 6, the adhesive of the polyorganosiloxane composition showed the highest adhesive strength to the PEEK plate among the tested adherends. Furthermore, it was confirmed that in every adherend, the adhesive strength of the plate with the corona treatment was higher than that of the plate without the corona treatment.

Experiment 5: Investigation of Thermal Stability

A polyorganosiloxane composition was prepared using PDMS of Mw=590 and TTIP and by stirring for 24 hours. Other preparation conditions were the same as those in Experiment 1. For comparison, a commercially available organic adhesive, Aron Alpha Extra, a bond manufactured by Konishi Co., Ltd. was also prepared. The adhesive of the polyorganosiloxane composition and the commercially available organic adhesive were each investigated for thermal stability using Thermoplus TG-8120, manufactured by Rigaku Co., Ltd. by increasing the temperature at a heating rate of 5° C./min FIGS. 7 and 8 show the TG-DTA graphs of the adhesive of the polyorganosiloxane composition and the commercially available organic adhesive, respectively.

Figure 7:
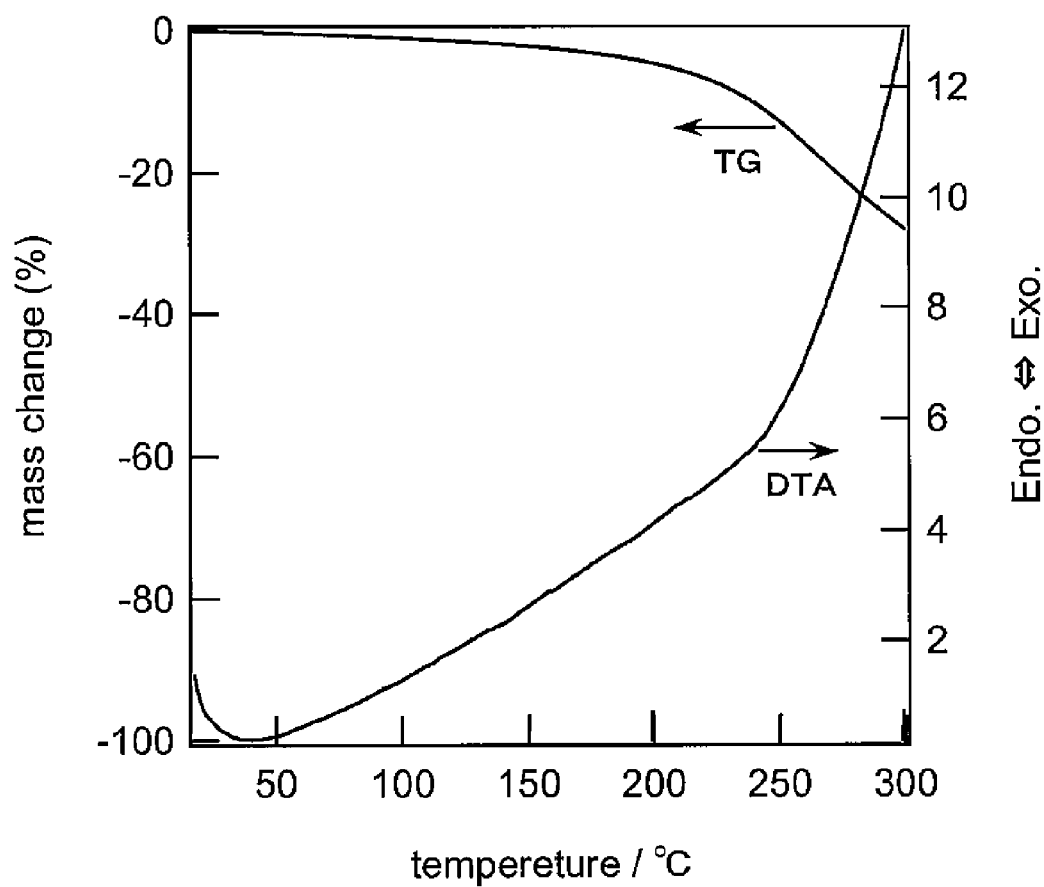
FIG. 7 shows TG-DTA of the adhesive of a polyorganosiloxane composition in Experiment 5.
Figure 8:
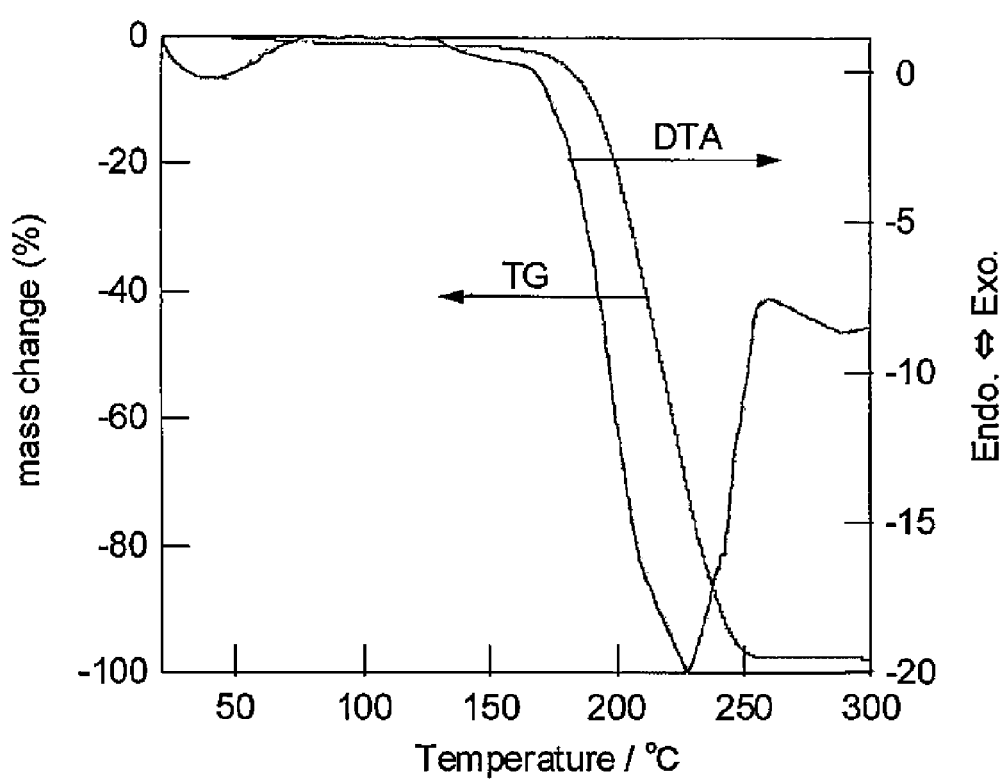
FIG. 8 shows TG-DTA of a commercially available organic adhesive in Experiment 5.

As obvious from comparison of FIGS. 7 and 8, in the case of the commercially available organic adhesive, a decrease in mass started when the temperature reached about 80° C., and the decrease in mass was about 100% at the time when the temperature reached 300° C. Thus, the thermal stability of the adhesive was low. On the other hand, in the case of the adhesive of the polyorganosiloxane composition, a decrease in mass started when the temperature reached about 80° C., but the decrease in mass at the time when the temperature reached 300° C. was about 30%. Thus, the results were that a high adhesive strength can be expected even at 180° C.

Then, a polyorganosiloxane composition was prepared by using PDMS of Mw=590 and TTIP at a TTIP/PDMS molar ratio of 2 and by stirring for 24 hours. Other preparation conditions were the same as those in Experiment 1. Then, the composition was disposed between two aluminum plates that were the same as those used in Experiment 1, and also aluminum wire having an average diameter of 25 μm was interposed therebetween, followed by curing under the same conditions as those in Experiment 1. Thus, a test piece having a cured product with a thickness of about 25 μm as the adhesive layer was prepared. A plurality of test pieces prepared under the above-described conditions were maintained under an atmosphere of 250° C. for a long time, and after passage of each predetermined period of time, the test piece was taken out and investigated for adhesive strength.

Figure 9:
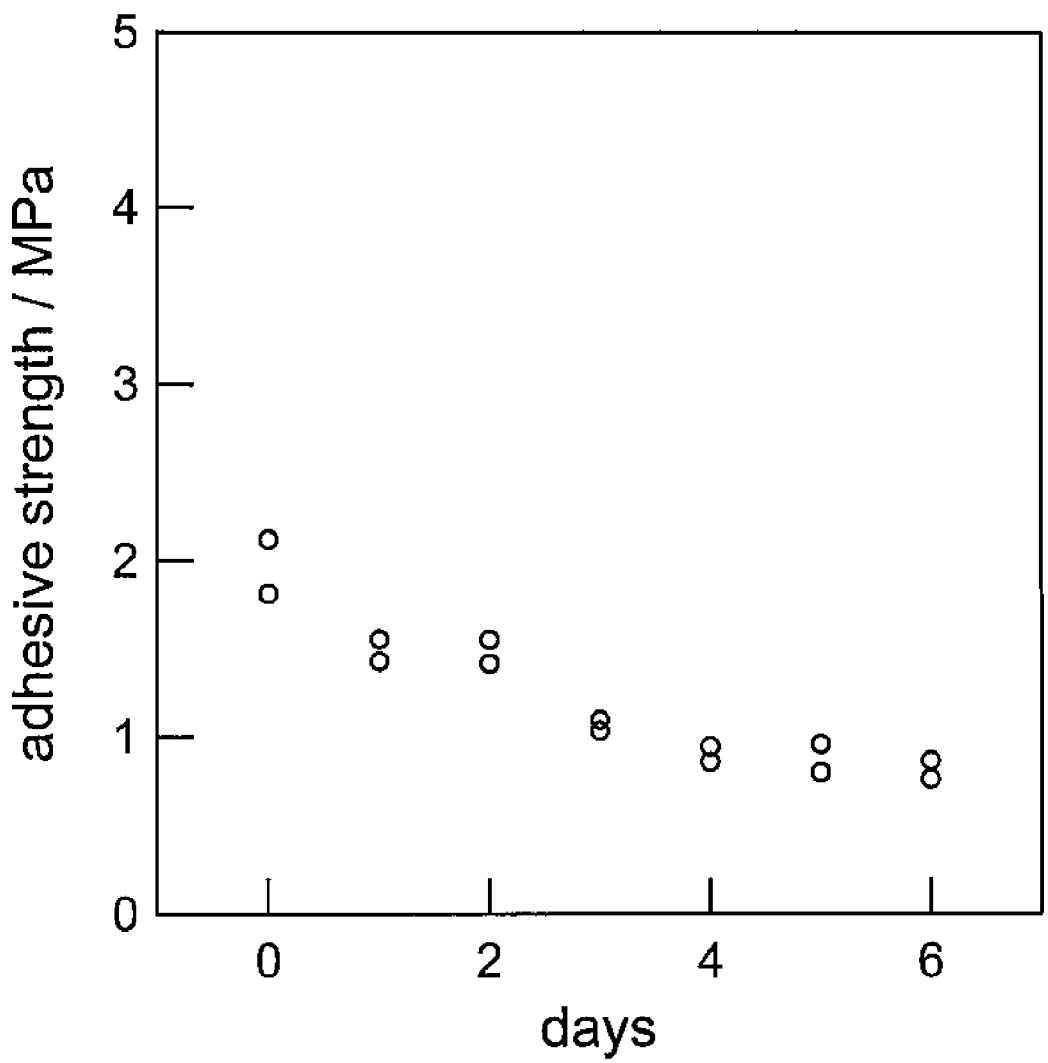
FIG. 9 shows a relationship between retention time at 250° C. and adhesive strength in Experiment 5.

FIG. 9 shows a relationship between retention time at 250° C. and adhesive strength.

As shown in FIG. 9, two test pieces were used for each period of time to investigate adhesive strength. The adhesive strength of the test pieces gradually decreased during 6 days (144 hours), but a high adhesive strength of about 1 MPa was maintained.

Experiment 6: Investigation of Heating-Cooling Cycle

Test pieces prepared by the same preparation conditions as those in Experiment 5 were investigated for change in adhesive strength when a cycle of cooling from 100° C. to −196° C. and then heating to 100° C. was repeated.

Figure 10:
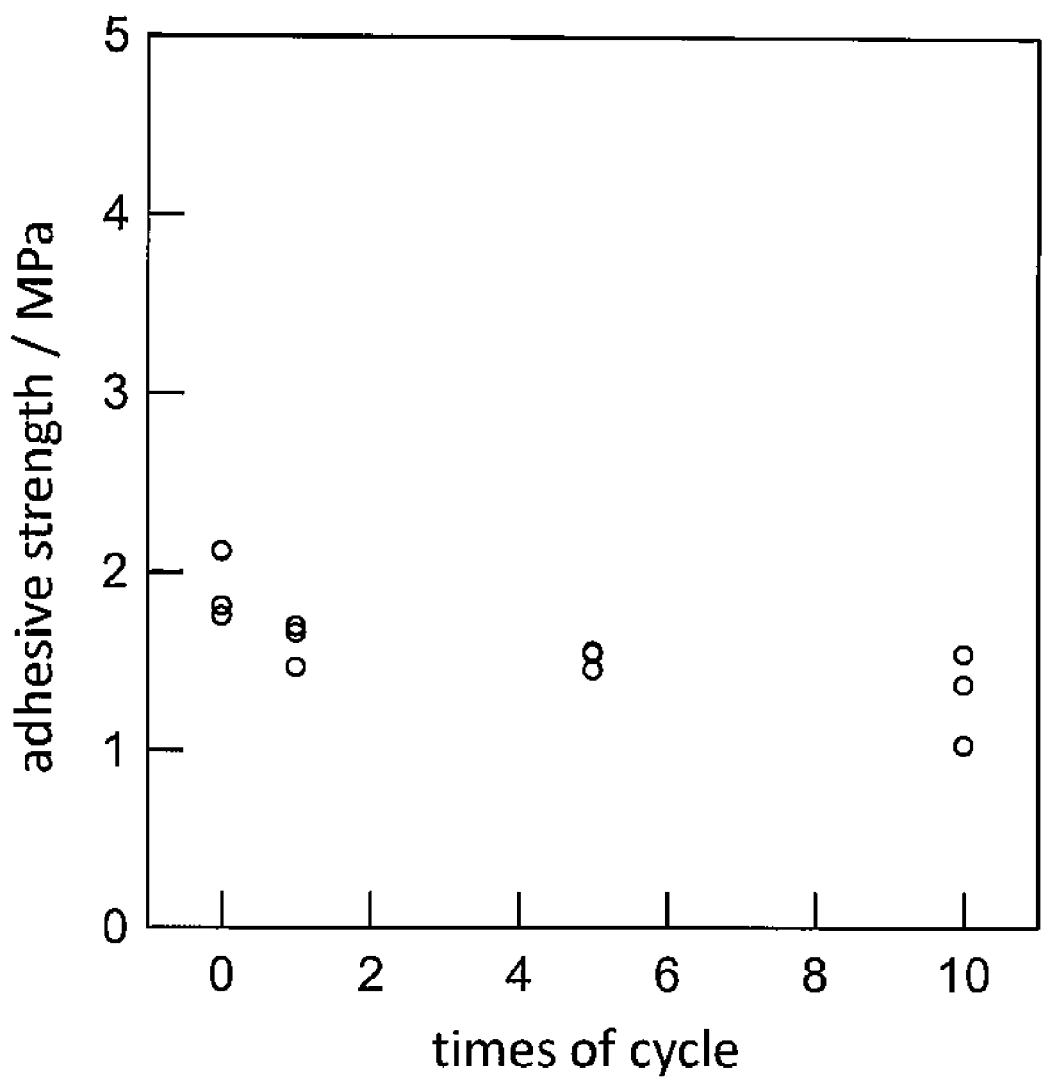
FIG. 10 shows a relationship between the number of heating-cooling cycles and adhesive strength in Experiment 6.

FIG. 10 shows a relationship between the number of heating-cooling cycles and adhesive strength.

As shown in FIG. 10, three test pieces were used for each number of times of cycles to investigate adhesive strength. The adhesive strength of the test pieces gradually decreased during repeating the cycle ten times, but a high adhesive strength of about 1 MPa was maintained to sufficiently endure heating and cooling repetition.

Furthermore, one of the aluminum plates on both surfaces of a cured product was exchanged to an epoxy resin plate or a ceramic plate (aluminum plate, the same shall apply hereinafter), and the adhesive strength between different types of substrates was investigated when the heating-cooling cycle was repeated. The results were similar to those shown in FIG. 10, and no detachment between the substrates was observed even after the heating and cooling cycle was repeated 10 times.

Experiment 7: Investigation of Thickness of Adhesive Layer

"No. 1"

A polyorganosiloxane composition was prepared by using PDMS of Mw=590 and TTIP and by stirring for 24 hours. Other preparation conditions were the same as those in Experiment 1. The polyorganosiloxane composition was disposed between two aluminum plates that were the same as those used in Experiment 1, and also glass beads having an average particle diameter of 200 μm or aluminum wire having an average diameter of 25 μm was interposed therebetween, followed by curing under the same conditions as those in Experiment 1. Thus, test pieces having cured products with a thickness of about 200 μm or a thickness of about 25 μm as the adhesive layers were prepared. Then, the cured two test pieces were subjected to the tensile-shear test under the same conditions as those of Experiment 1.

Figure 11:
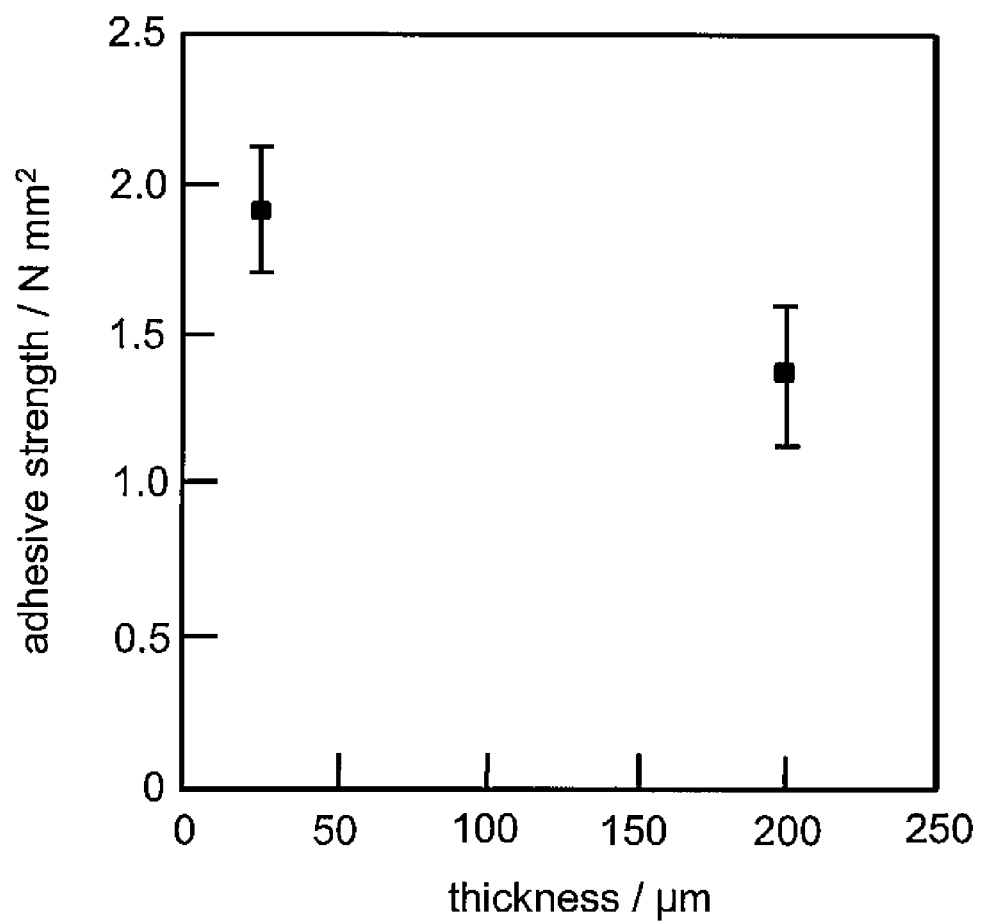
FIG. 11 shows a relationship between thickness of each cured product and adhesive strength in each test piece in Experiment 7 (No. 1).

FIG. 11 shows the adhesive strength of the cured product of each test piece. As shown in FIG. 11, a smaller thickness of the adhesive layer resulted in a higher adhesive strength.

"No. 2"

One piece, two pieces, four pieces, and eight pieces of the aluminum wire having an average diameter of 25 μm used in the above "No. 1" were respectively laminated to prepare four types of aluminum wire bundles in total. These wire bundles were each interposed between two aluminum plates to form a gap of 25 μm, 50 μm, 100 μm, or 200 μm therebetween, and the same polyorganosiloxane composition as in the "No. 1" was supplied to the gaps, followed by curing under the same conditions as those in Experiment 1. Three test pieces were prepared under such conditions for each type of the cured products with a thickness of about 25 to 200 μm as the adhesive layers. Then, three test pieces for each of the four types were subjected to the tensile-shear test under the same conditions as those in Experiment 1.

Figure 12:
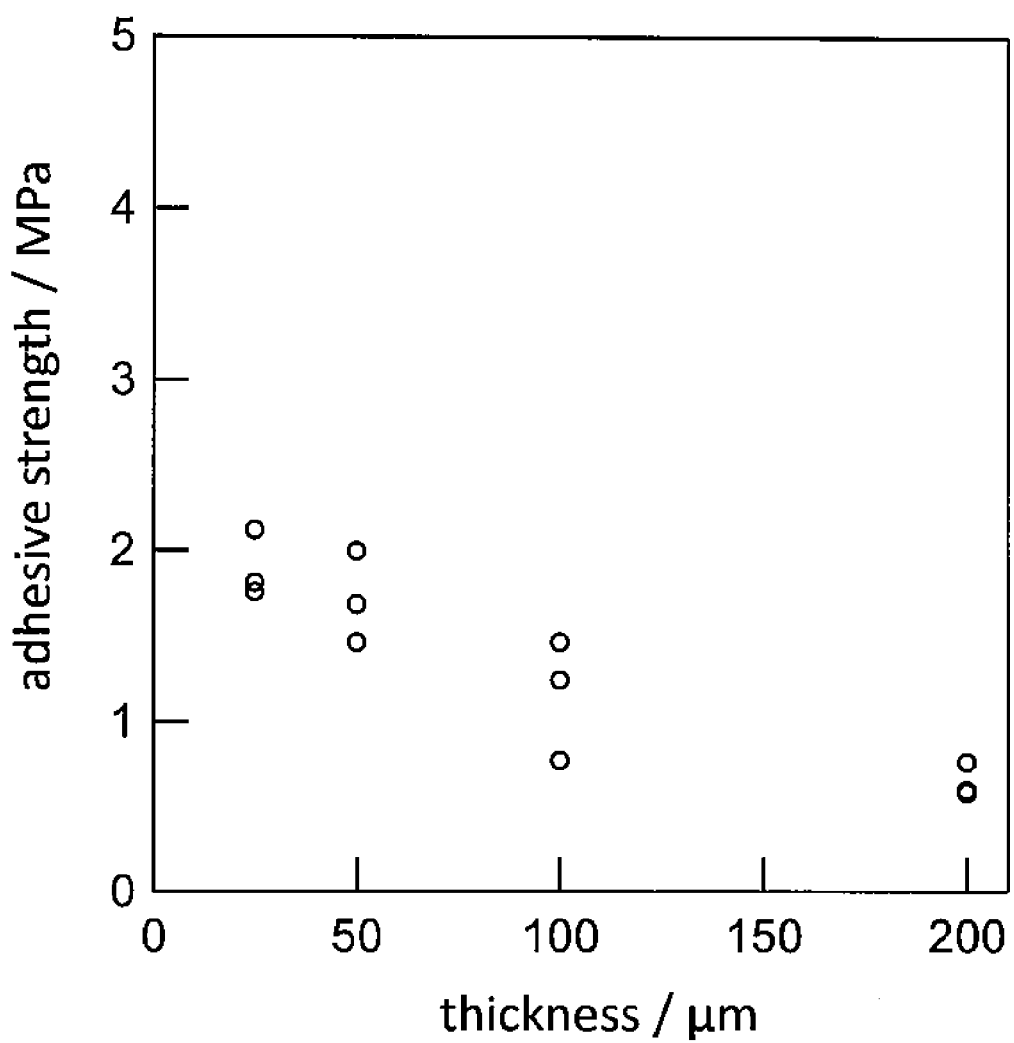
FIG. 12 shows a relationship between thickness of each cured product and adhesive strength in each test piece in Experiment 7 (No. 2).

FIG. 12 shows the adhesive strength of a cured product of each test piece. As shown in FIG. 12, reproducibility of "No. 1" could be confirmed, and a smaller thickness of the adhesive layer resulted in a higher adhesive strength.

Experiment 8: Investigation of Adhesive Strengths of Products Prepared Using Different Kinds of Titanium Alkoxides Polyorganosiloxane compositions were prepared using, in addition to TTIP used above, titanium tetra-n-propoxide (TTnP, manufactured by Kanto Chemical Co., Ltd.), titanium tetra normalbutoxide (TTnB, manufactured by Kanto Chemical Co., Ltd.), titanium tetraisobutoxide (TTIB, manufactured by Alfa Aesar), or titanium tetra-ter-butoxide (TTtB, manufactured by Aldrich), as the titanium alkoxide. The preparation conditions were the same as those in Experiment 1 in principle except that the amount of each titanium alkoxide was 2 moles relative to one mole of the PDMS and that stirring treatment was performed for 24 hours. However, in the PDMS-TTIB system, since the drying of the polyorganosiloxane composition was slightly insufficient, the curing at 180° C. was performed for 24 hours.

Figure 13:
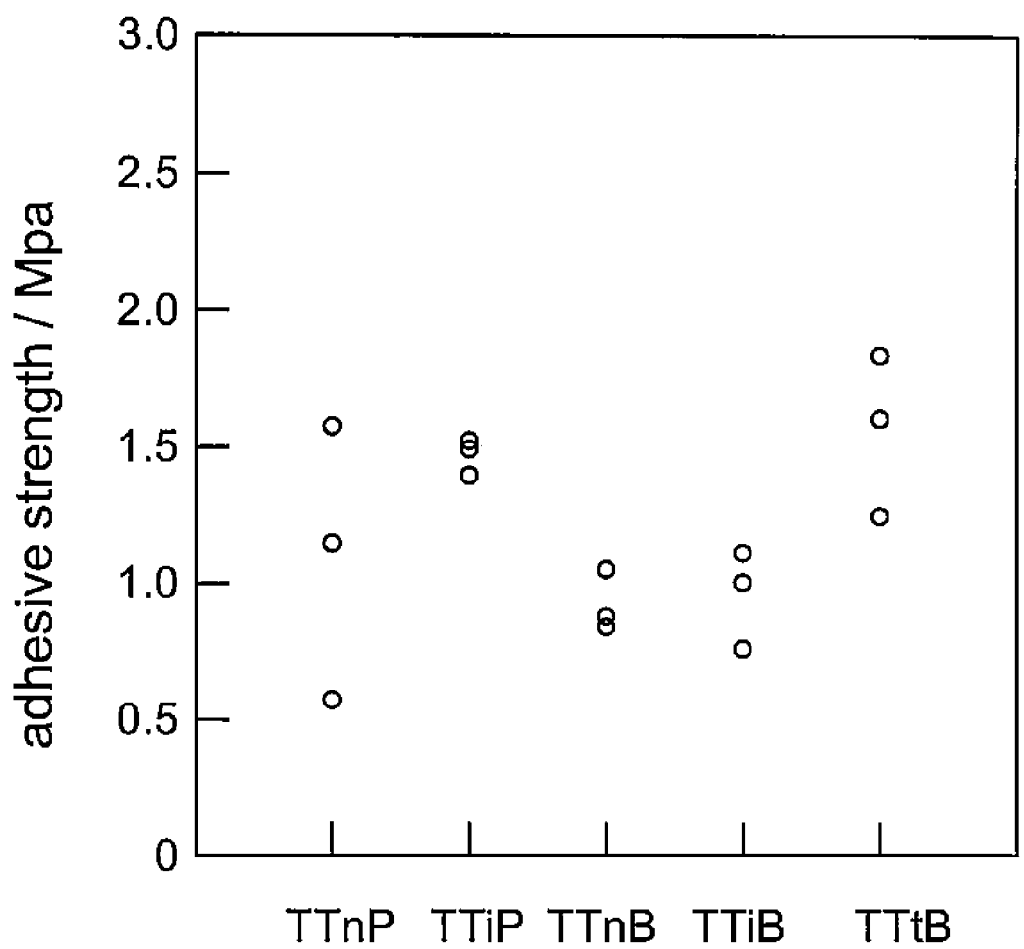
FIG. 13 shows the adhesive strength of each cured product used polyorganosiloxane compositions respectively including different types of titanium alkoxides in Experiment 8.

FIG. 13 shows the adhesive strength of the cured product used each polyorganosiloxane composition.

As shown in FIG. 13, it was confirmed that titanium alkoxides other than TTIP could give cured products each having an adhesive strength higher than 1 MPa. In particular, it was confirmed that TTtB is a titanium alkoxide that can show an adhesive strength equivalent to that of TTIP.

Experiment 9: Investigation of Adhesive Strength According to TTIP/PDMS Molar Ratios In a PDMS-TTIP system using TTIP as the titanium alkoxide, polyorganosiloxane compositions were prepared at TTIP/PDMS molar ratios of from 0.5 to 3.0. The stirring time was set to 24 hours, but the PDMS and TTIP used and other conditions were the same as those in Experiment 1.

Figure 14:
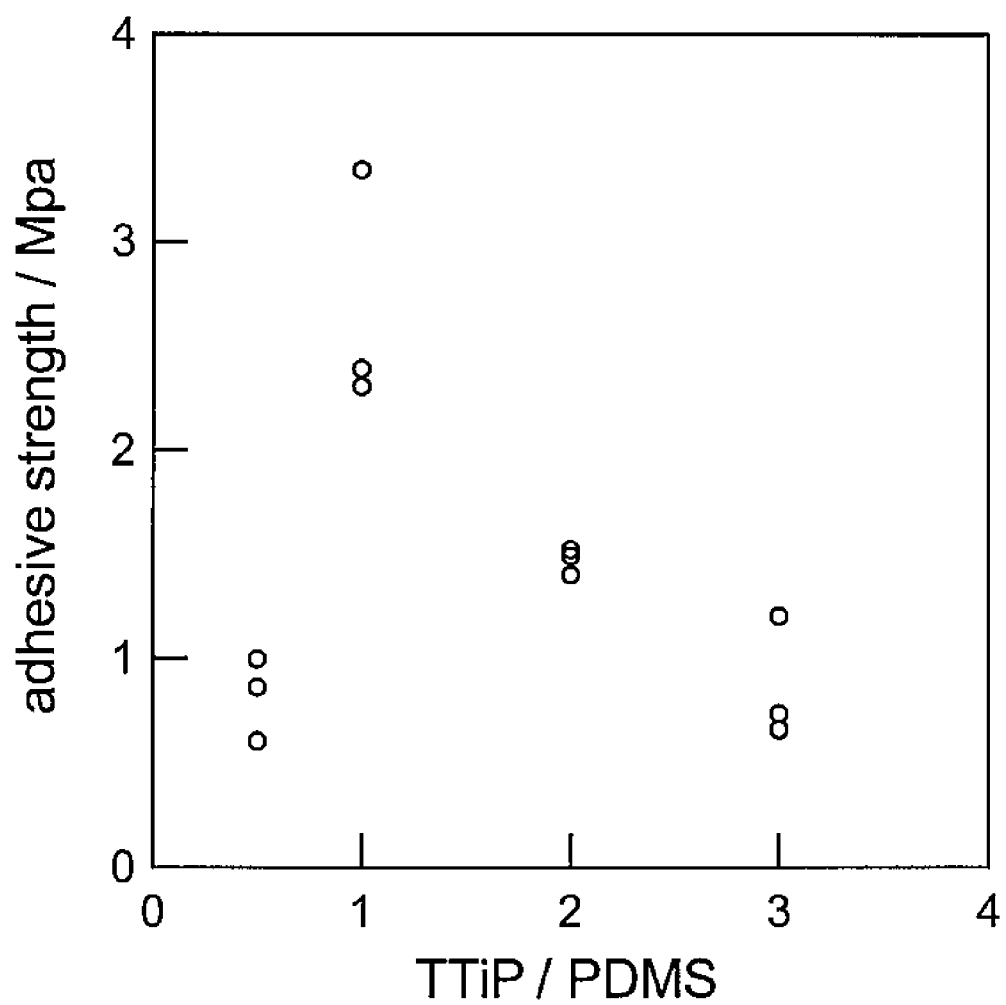
FIG. 14 shows a relationship between TTIP/PDMS molar ratio of each polyorganosiloxane composition and adhesive strength in Experiment 9.

FIG. 14 shows a relationship between TTIP/PDMS molar ratio of each polyorganosiloxane composition and adhesive strength.

As shown in FIG. 14, the cured product showed the highest adhesive strength when the polyorganosiloxane composition having a TTIP/PDMS molar ratio of 1 was used. In addition, though the adhesive strength in the case of the polyorganosiloxane composition having a TTIP/PDMS molar ratio of 2 was lower than that in the case of the TTIP/PDMS molar ratio of 1, a stably high adhesive strength was observed. The operation of the polyorganosiloxane composition having a TTIP/PDMS molar ratio of 2 was easier than the case of the TTIP/PDMS molar ratio of 1. It is conceivable that this is caused by that a smaller TTIP/PDMS molar ratio results in a higher viscosity to make application of the adhesive difficult.

Next, experimental results of systems using aluminum alkoxides instead of titanium alkoxides will be described.

2. Silanol-Terminated Polydimethylsiloxane-Aluminum Alkoxide System

Experiment 10: Investigation of Al—O—Si bond

In a glove box through which dry nitrogen gas flowed in and out, a silanol-terminated polydimethylsiloxane (manufactured by Gelest, Inc., hereinafter referred to as "PDMS") having an Mw of 590 when actually measured by GPC (nominal Mw: 400 to 700, hereinafter referred to as Mw=590); aluminum tri-s-butoxide (AlsB, manufactured by Wako Pure Chemical Industries, Ltd.) at a molar ratio PDMS:AlsB of 1:2; and a stirrer chip were introduced into a glass container having a lid (capacity: 50 mL, a vial with screw), followed by stirring with a magnetic stirrer for 288 hours in an incubator maintained at 25° C. The stirring rate was set to 550 rpm. The solutions were sampled, during stirring, at 48 hours, 72 hours, 96 hours, 120 hours, 144 hours, 168 hours, 240 hours, and 288 hours after the start of the stirring. These samples including the sample after the completion of the stirring (after 288 hours) were used as polyorganosiloxane compositions for evaluation of adhesive strength of each cured product. Each polyorganosiloxane composition was subjected to identification of bond using a Fourier transform infrared spectrophotometer (IR Prestige-21, manufactured by Shimadzu Corp., attachment: Durasmpll II, manufactured by Smith, hereinafter referred to as "FT-IR"). The adherends were the same as those in Experiment 1, and the configuration of the test pieces for the adhesion performance evaluation was the same as that shown in FIG. 1.

The curing was performed by increasing the temperature to 80° C. at a heating rate of 10° C./min, keeping 80° C. for 6 hours, increasing the temperature to 105° C. at the same heating rate as above, keeping 105° C. for 12 hours, increasing the temperature to 180° C. at the same heating rate as above, and keeping 180° C. for 12 hours, followed by natural cooling. After cooling, the test piece was fixed at both ends (end regions each having a width of 25 mm and a length of 50 mm) and was stretched at a tension rate of 5 mm/min in opposite directions using an RTC Tensilon universal tester, RTC250A, manufactured by A&D Co., in accordance with JIS K6251. Hereinafter, the tension rate in subsequent evaluation of adhesion performance was set to this rate.

Figure 15:
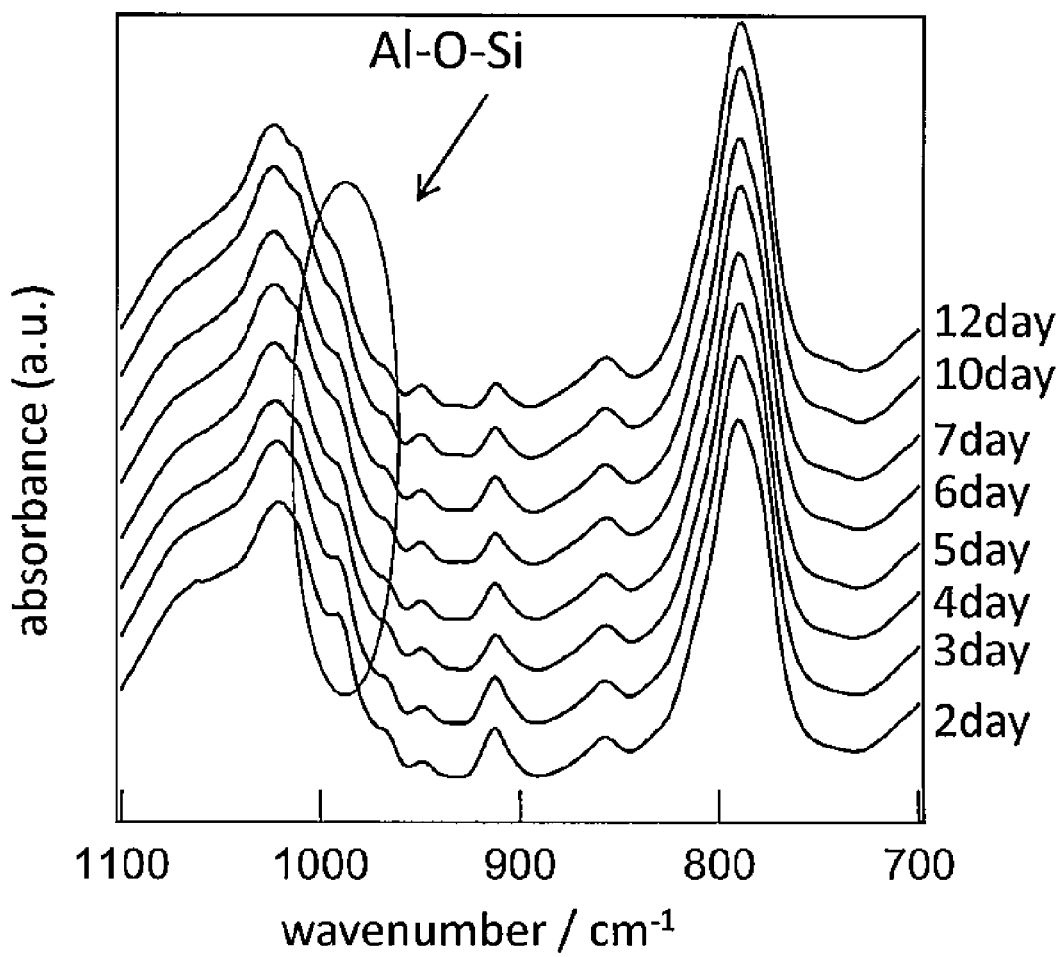
FIG. 15 shows results of FT-IR, showing an Al—O—Si bond at approximately 1000 $cm^{-1}$ in each polyorganosiloxane composition in Experiment 10.
Figure 16:
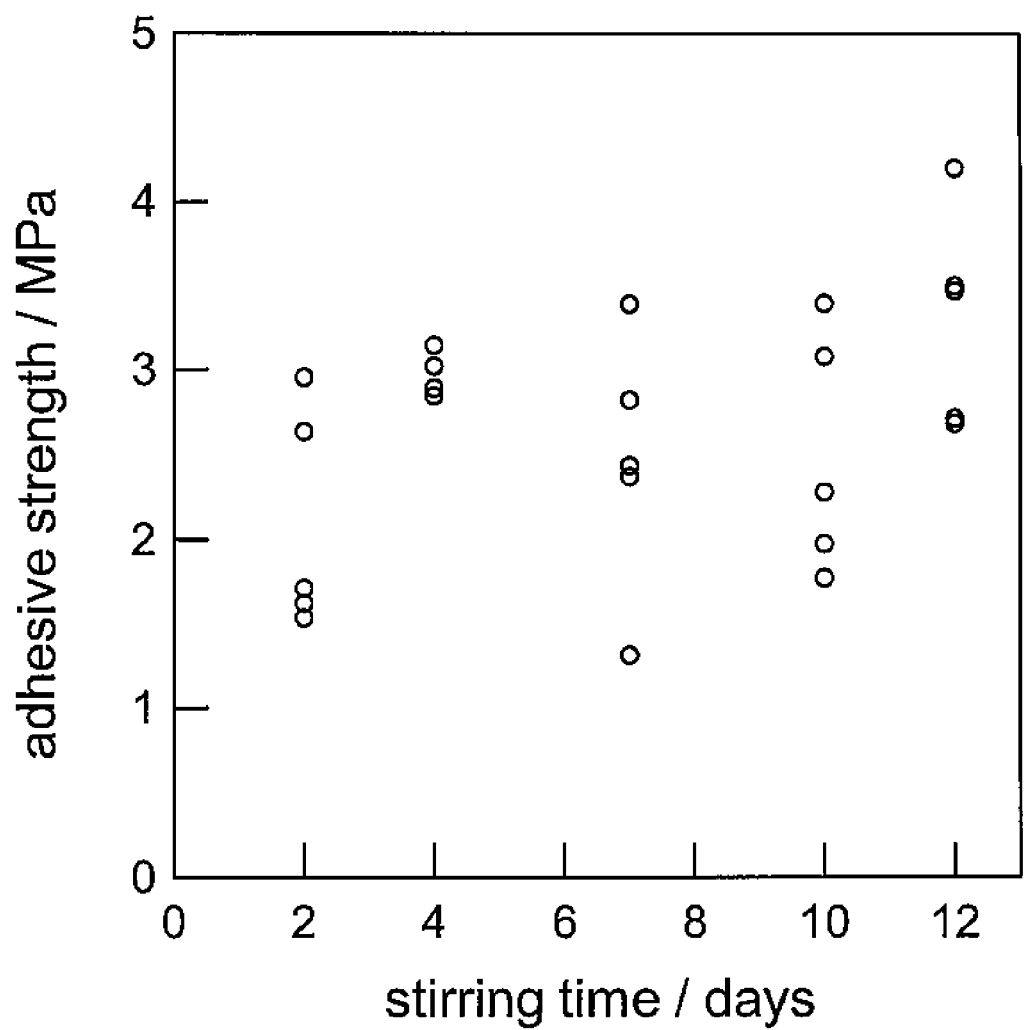
FIG. 16 shows a relationship between stirring time of each polyorganosiloxane composition and adhesive strength of a cured product used each composition in Experiment 10.

FIGS. 15 and 16 show an Al—O—Si bond at approximately 1000 $cm^{-1}$ in each polyorganosiloxane composition and the adhesive strength of a cured product used each composition, respectively.

As shown in FIG. 15, no large change was recognized in peaks showing the Al—O—Si bonds by varying the stirring time. This means that the Al—O—Si bond is more stable than the Ti—O—Si bond. As shown in FIG. 16, all of the cured products used the polyorganosiloxane compositions prepared under the conditions of stirring times of 48 to 288 hours had high adhesive strengths reaching 3 MPa.

Experiment 11: Investigation of Mw of Polyorganosiloxane

Four types of polyorganosiloxane compositions were prepared using four types of PDMSs, Mw=590, 1000 (manufactured by Shin-Etsu Chemical Co., Ltd.), 2000 to 3500 (manufactured by Gelest, Inc.), and 3000 (manufactured by Shin-Etsu Chemical Co., Ltd.), and AlsB by stirring for 72 hours. The stirring time was set to 72 hours because of ensuring sufficient time for changing the polyorganosiloxane compositions from gel states to solution states. In the subsequent experiments, stirring was performed for 72 hours for the same reason. In this experiment, the preparation conditions excluding the stirring time were the same as those in Experiment 10. The four types of the polyorganosiloxane compositions in total were each applied as an adhesive between two aluminum plates, followed by curing, under the same conditions as those in Experiment 10.

Figure 17:
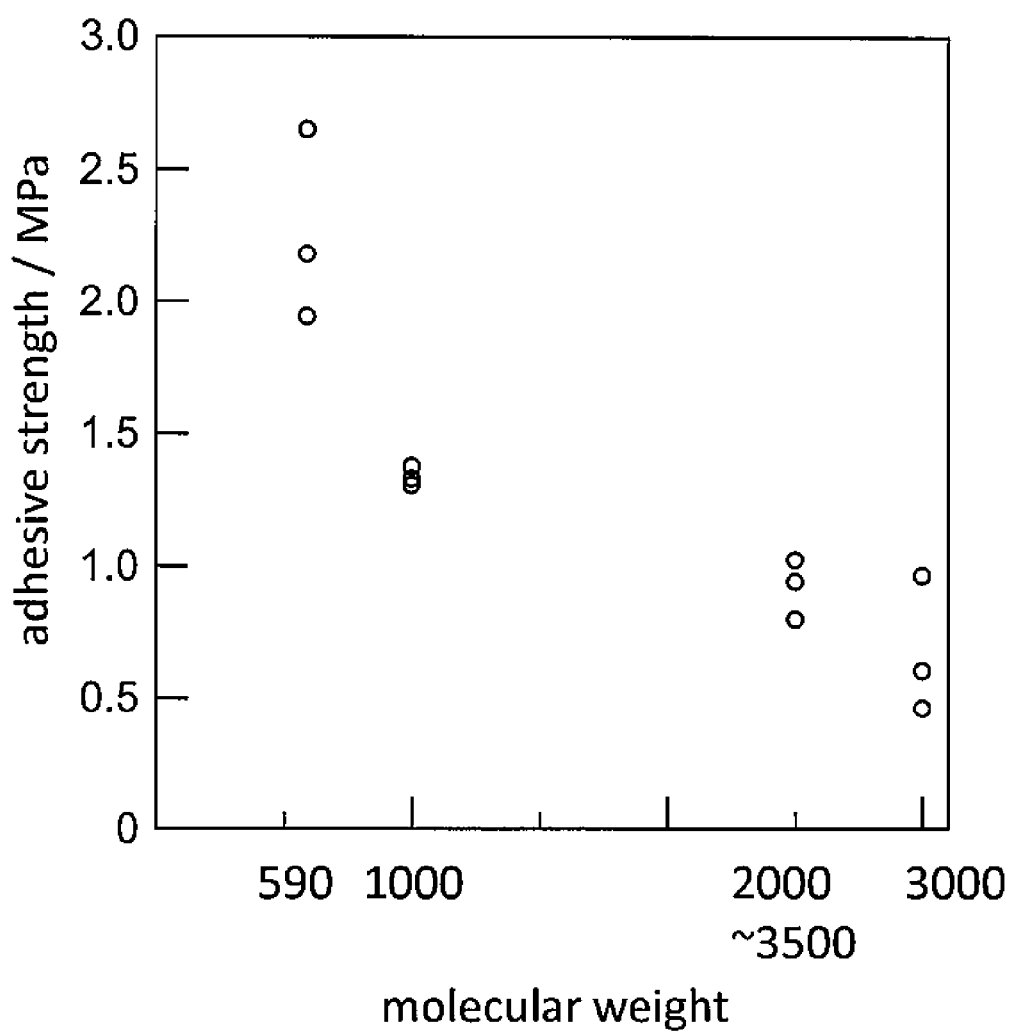
FIG. 17 shows a relationship between Mw of PDMS in each polyorganosiloxane composition and adhesive strength of a cured product used each composition in Experiment 11.

FIG. 17 shows adhesive strength of the cured product used each polyorganosiloxane composition.

As shown in FIG. 17, a smaller Mw of PDMS resulted in a higher adhesive strength. It is conceivable from this result that the smaller Mw of PDMS relates the high adhesive strength of a cured product, like the system using the titanium alkoxide.

Experiment 12: Investigation of Adherend Selectivity

A polyorganosiloxane composition was prepared using PDMS of Mw=590 and AlsB and by stirring for 72 hours. Other preparation conditions were the same as those in Experiment 10. The polyorganosiloxane composition was applied as an adhesive under the same conditions as in Experiment 10 between two glass plates, two Fe plates, two SUS plates, two Ti plates, and two Cu plates, followed by curing. The glass plates, the Fe plates, the SUS plates, the Ti plates, and the Cu plates serving as the adherends were used in the same configuration as that of the aluminum plates used in Experiment 10. The Fe plates and the Cu plates were subjected to surface treatment with a solution of 5% ens acid in order to remove the oxide layers on adherend surfaces. Three test pieces were prepared for each type of the adherends (each referred to as Samples 1 to 3).

TABLE 4

|  | Glass Plate | Al Plate | Fe Plate | SUS Plate | Ti Plate | Cu Plate |
|---|---|---|---|---|---|---|
| Sample 1 | ○ | 2.653 | 2.041 | 0.753 | 1.934 | 2.306 |
| Sample 2 | ○ | 2.18 | 1.864 | 1.468 | 1.688 | 1.172 |
| Sample 3 | ○ | 1.942 | 2.775 | 1.245 | 2.215 | 2.679 |
| Ave. |  | 2.258 | 2.227 | 1.155 | 1.946 | 2.052 |

(MPa)

Figure 18:
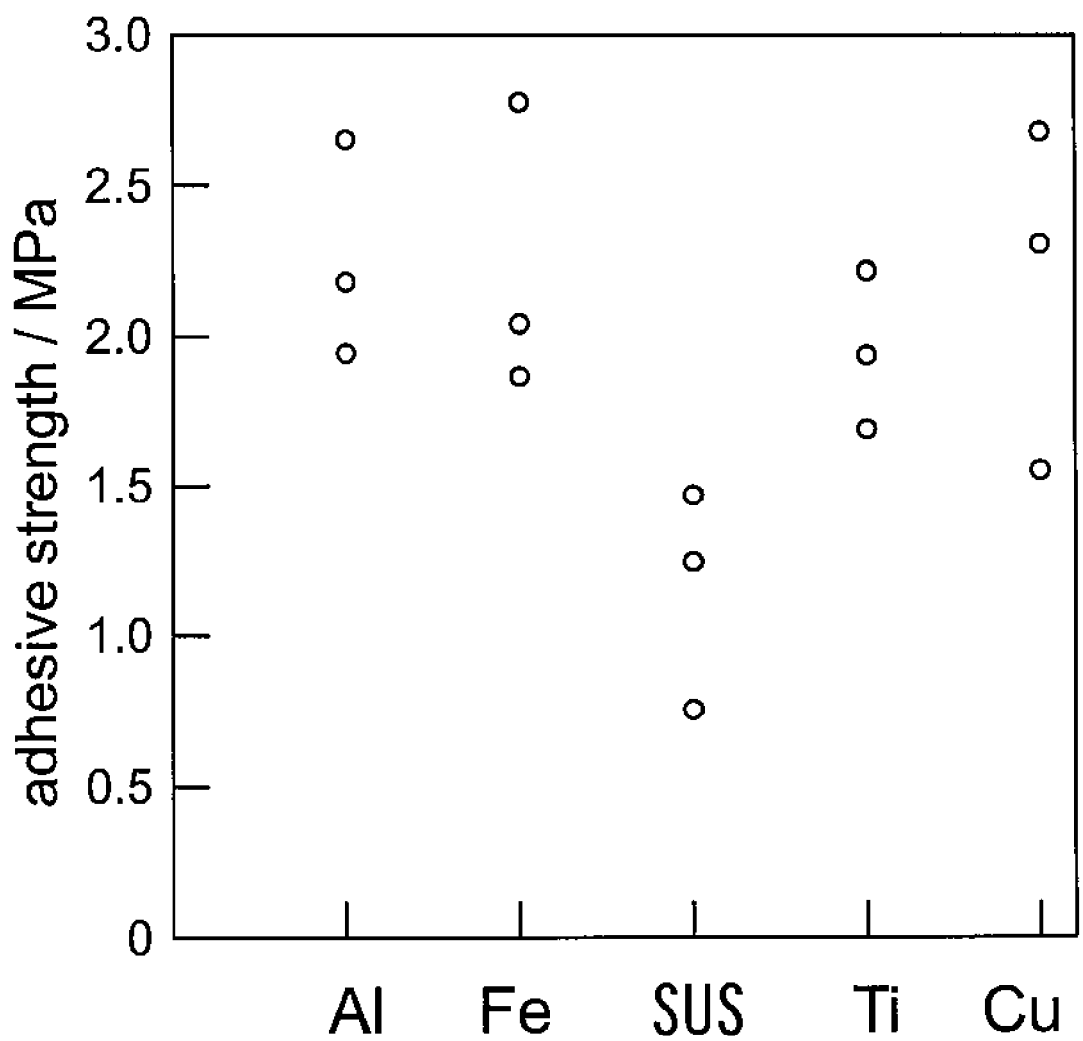
FIG. 18 shows tensile-shear test results of the test pieces of each type of metal adherends in Experiment 12.

Table 4 and FIG. 18 show the tensile-shear test results of the test pieces of each type of the adherends. In Table 4, the circle mark means that the strength could not be measured because of breakage of the substrate before the measurement. The units of the numerical values in the table are MPa.

As shown in Table 4, the adhesive of the polyorganosiloxane composition showed a significantly high adhesive strength to the glass plates, so that the glass plates themselves were broken before breakage of the cured product of the composition or detachment of the glass plate at the interface with the cured product. As shown in Table 4 and FIG. 18, the adhesive strength to the SUS plate was relatively low, but it was higher than 1 MPa. Thus, the adhesive of the polyorganosiloxane composition showed a high adhesive strength to not only the glass plate but also to all metal adherends used in the test.

Experiment 13: Investigation of Adhesiveness to Organic Substrate

A polyorganosiloxane composition was prepared using PDMS of Mw=590 and AlsB and by stirring for 72 hours. Other preparation conditions were the same as those in Experiment 10. The polyorganosiloxane composition was applied as an adhesive between two PEEK plates, two PP plates, two PVC plates, and two PMMAA plates under the same conditions as those in Experiment 10 except that the adherends were different. In addition, samples for investigating the effect of corona treatment to adherend surface were prepared by subjecting the adherend surface of each plate to corona treatment and then applying the adhesive to the surface. The corona treatment was performed by exposing each adherend to a flame with a distance of about 5 mm from the surface of the adherend for 10 seconds. The curing conditions (heating conditions) of the adhesive were the same as those in Experiment 4 ("No. 2"), and the configuration of the substrates serving as adherends was the same as that of the aluminum plates used in Experiment 10. Three test pieces were prepared for each type of the adherends (each referred to as Samples 1 to 3).

Figure 19:
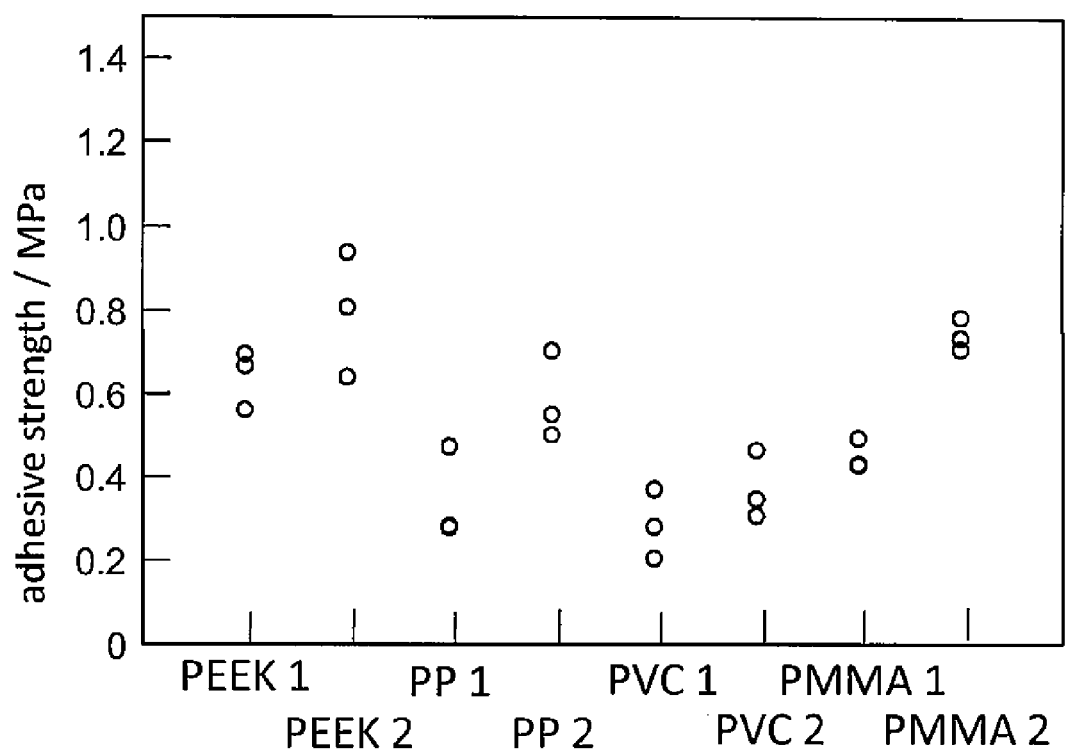
FIG. 19 shows tensile test results of the test pieces of each type of resin adherends in Experiment 13.

FIG. 19 shows the tensile test results of the test pieces of each type of the adherends. In FIG. 19, test pieces without the corona treatment are shown with "1" at the end of the material name, such as "PEEK1", and test pieces with the corona treatment are shown with "2" at the end of the material name, such as "PEEK2".

As shown in FIG. 19, the adhesive of the polyorganosiloxane composition showed the highest adhesive strength to the PEEK plate among the tested adherends. Furthermore, it was confirmed that in every adherend, the adhesive strength of the plate with the corona treatment was higher than that of the plate without the corona treatment.

Experiment 14: Investigation of Thermal Stability

A polyorganosiloxane composition was prepared using PDMS of Mw=590 and AlsB at an AlsB/PDMS molar ratio of 2 and by stirring for 72 hours. Other preparation conditions were the same as those in Experiment 10. Then, the composition was disposed between two aluminum plates that were the same as those used in Experiment 10, and also aluminum wire having an average diameter of 25 lam was interposed therebetween, followed by curing under the same conditions as those in Experiment 10. Thus, a test piece having a cured product with a thickness of about 25 μm as the adhesive layer was prepared. A plurality of test pieces produced under the above-described conditions were maintained under an atmosphere of 250° C. for a long time, and after passage of each predetermined period of time, the test piece was taken out and investigated for adhesive strength.

Figure 20:
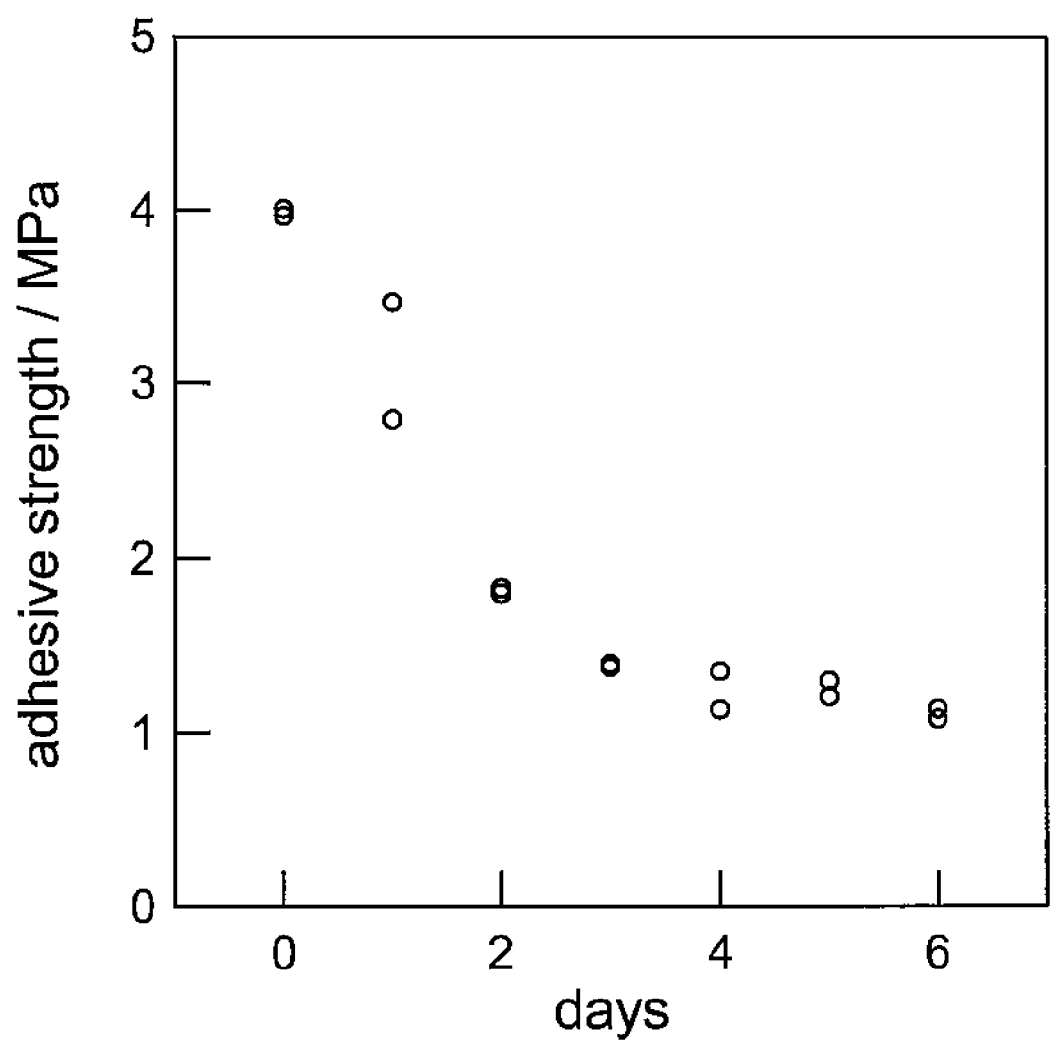
FIG. 20 shows a relationship between retention time at 250° C. and adhesive strength in Experiment 14.

FIG. 20 shows a relationship between retention time at 250° C. and adhesive strength.

As shown in FIG. 20, two test pieces were used for each period of time to investigate adhesive strength. The adhesive strength of the test pieces gradually decreased during 6 days (144 hours), but a high adhesive strength of about 1 MPa was maintained.

Experiment 15: Investigation of Heating-Cooling Cycle

Test pieces prepared by the same preparation conditions as those in Experiment 14 were investigated for change in adhesive strength when a cycle of cooling from 100° C. to −196° C. and then heating to 100° C. was repeated.

Figure 21:
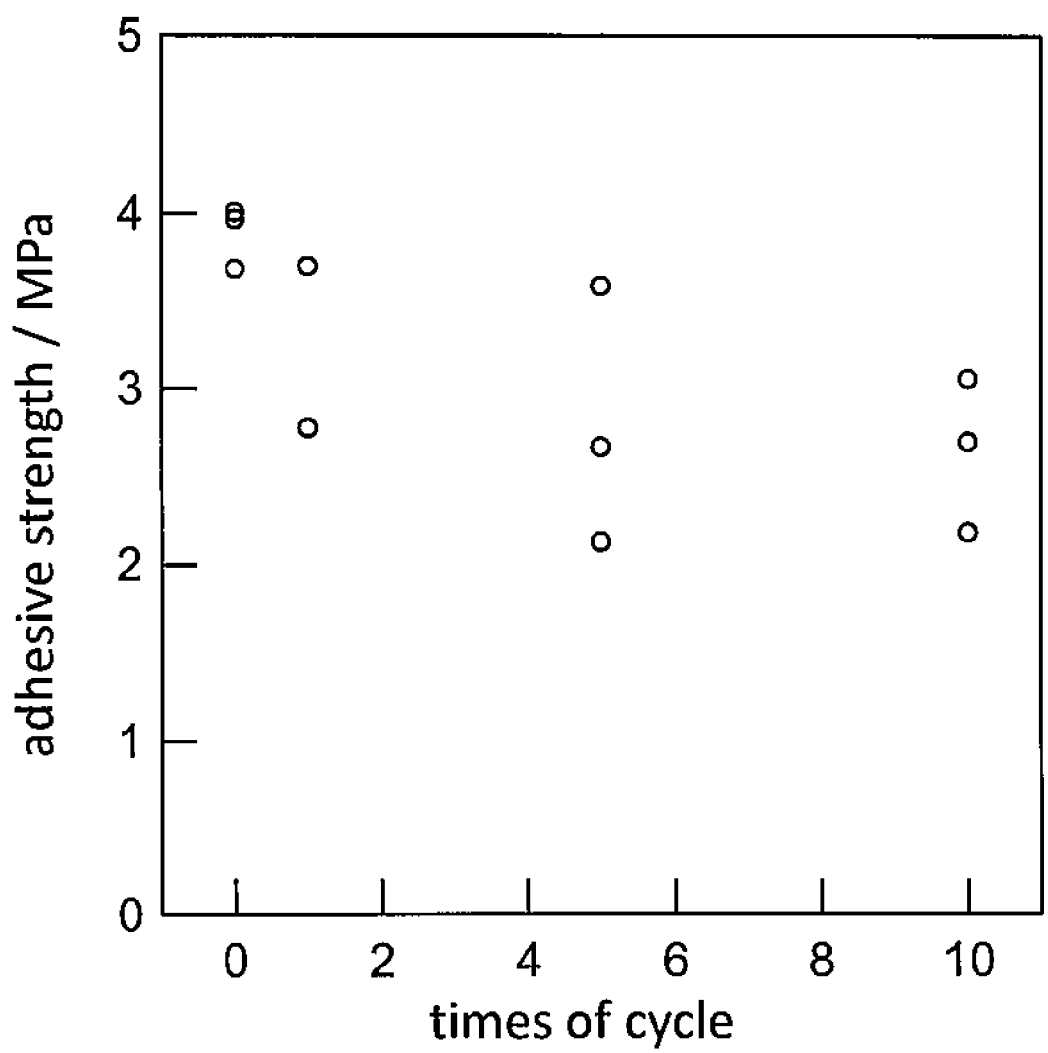
FIG. 21 shows a relationship between the number of heating-cooling cycles and adhesive strength in Experiment 15.

FIG. 21 shows a relationship between the number of heating-cooling cycles and adhesive strength.

As shown in FIG. 21, three test pieces were used for each number of times of cycles to investigate adhesive strength. The adhesive strength of the test pieces gradually decreased during repeating the cycle ten times, but a significantly high adhesive strength of about 2 MPa was maintained to sufficiently endure repetition of heating and cooling.

Furthermore, one of the aluminum plates on both sides of a cured product was exchanged to an epoxy resin plate or a ceramic plate, and the adhesive strength between different types of substrates was investigated when the heating-cooling cycles was repeated. The results were similar to those shown in FIG. 21, and no detachment between the substrates was observed even after the heating and cooling cycle was repeated 10 times.

Experiment 16: Investigation of Thickness of Adhesive Layer

A polyorganosiloxane composition was prepared using PDMS of Mw=590 and AlsB and by stirring for 72 hours. Other preparation conditions were the same as those in Experiment 10. One piece, two pieces, four pieces, and eight pieces of aluminum wire having an average diameter of 25 μm were respectively laminated to prepare four types of aluminum wire bundles in total. These wire bundles were each interposed between two aluminum plates to form a gap of 25 μm, 50 μm, 100 μm, or 200 μm therebetween, and the polyorganosiloxane composition was supplied to the gaps, followed by curing under the same conditions as those in Experiment 10. Three test pieces were prepared under such conditions for each type of the cured products having a thickness of about 25 to 200 μm as the adhesive layers. Then, three test pieces for each of the four types were subjected to the tensile-shear test under the same conditions as those in Experiment 10.

Figure 22:
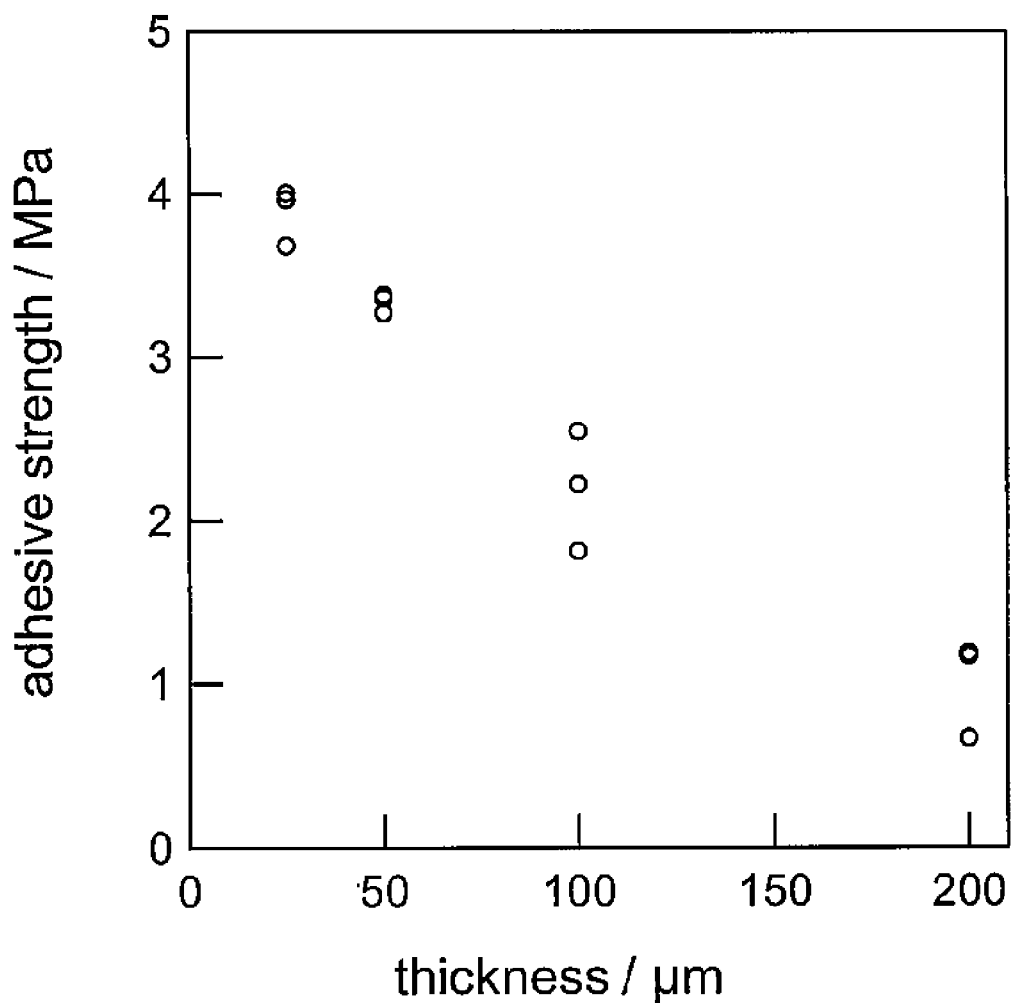
FIG. 22 shows a relationship between thickness of each cured product and adhesive strength in each test piece in Experiment 16.

FIG. 22 shows the adhesive strength of the cured product of each test piece. As shown in FIG. 22, a smaller thickness of the adhesive layer resulted in a higher adhesive strength.

Experiment 17: Investigation of Adhesive Strengths of Products Prepared Using Different Kinds of Aluminum Alkoxides Polyorganosiloxane compositions were prepared using, in addition to AlsB used above, aluminum triethoxide (AlE, manufactured by Wako Pure Chemical Industries, Ltd.), as the aluminum alkoxide. The preparation conditions were the same as those in Experiment 10 except that the amount of each aluminum alkoxide was 2 moles relative to one mole of the PDMS and that stirring treatment was performed for 72 hours.

Figure 23:
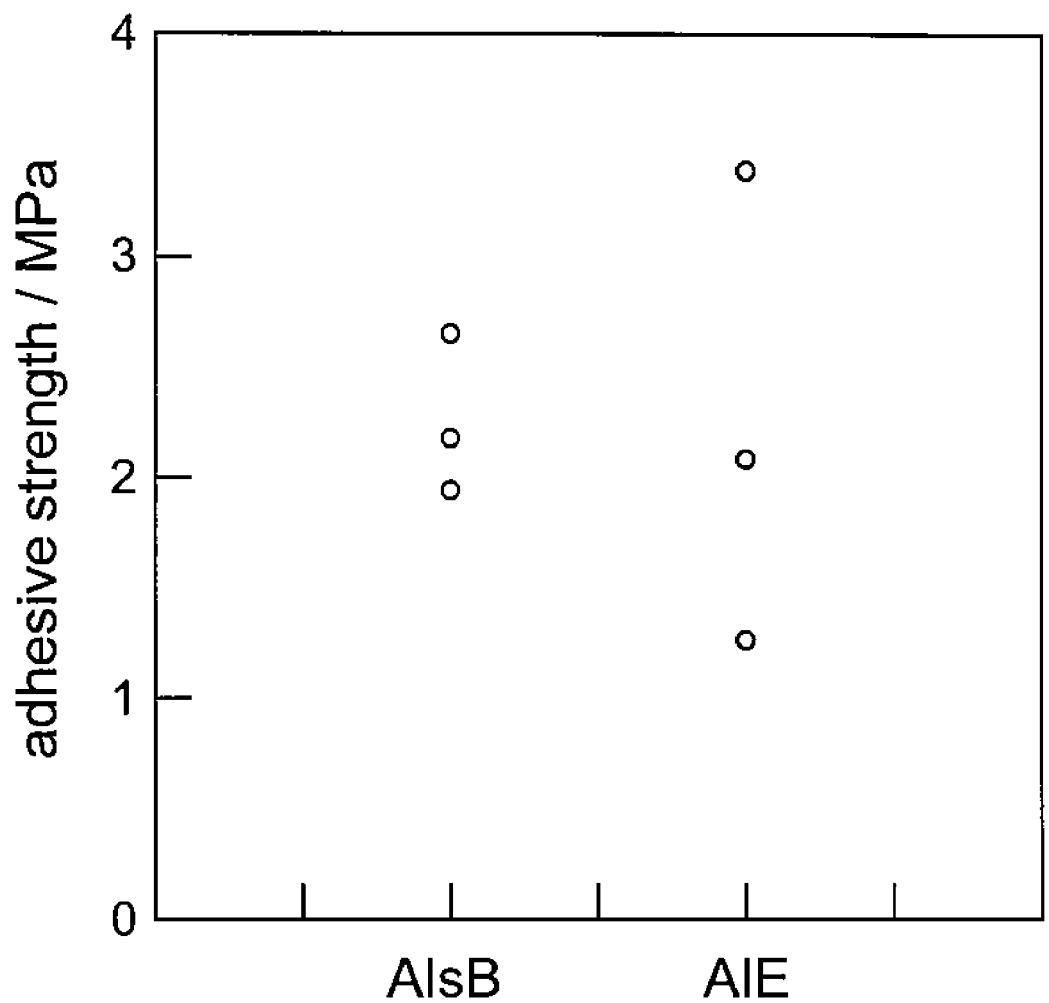
FIG. 23 shows the adhesive strength of each cured product used polyorganosiloxane compositions including different types of aluminum alkoxides in Experiment 17.

FIG. 23 shows the adhesive strength of the cured product used each polyorganosiloxane composition.

As shown in FIG. 23, in every case of curing the polyorganosiloxane composition, a high adhesive strength was observed. In the system of using AlE, the adhesive strengths varied widely. It was presumed that this was caused by following reason: The polyorganosiloxane composition itself in the PDMS-AlE system was in a gel state and had high viscosity, which caused a difference in area adhering to an adherend. On the other hand, it was presumed that the polyorganosiloxane composition in the PDMS-AlsB system had fluidity to easily allow the area adhering to an adherend to be approximately constant. In a view of easiness in handling as an adhesive, AlsB is considered better than AlE.

Experiment 18: Investigation of Adhesive Strength According to AlsB/PDMS Molar Ratios In a PDMS-AlsB system using AlsB as the aluminum alkoxide, polyorganosiloxane compositions were prepared at AlsB/PDMS molar ratios of from 0.5 to 3.0. The stirring time was set to 72 hours, but the PDMS and AlsB used and other conditions were the same as those in Experiment 10.

Figure 24:
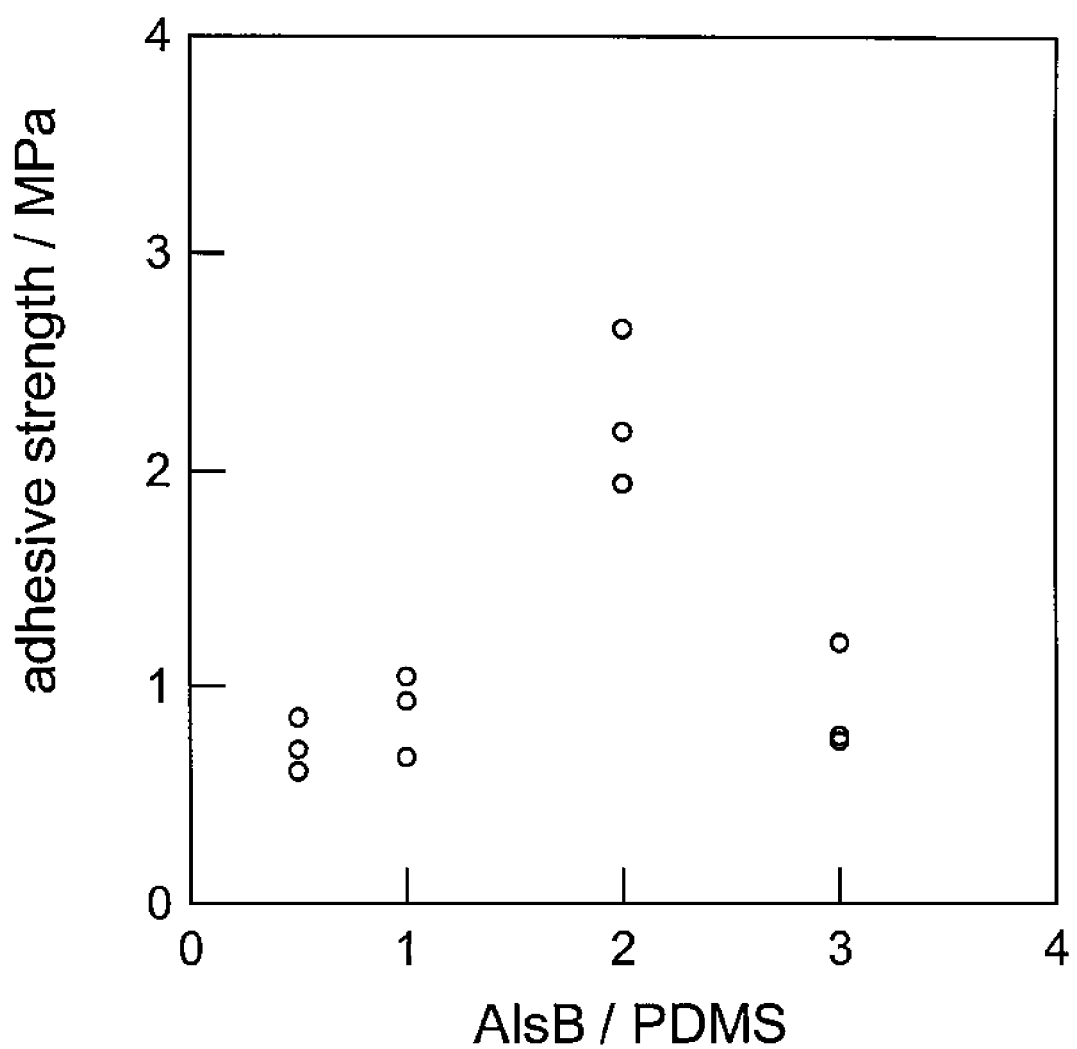
FIG. 24 shows a relationship between AlsB/PDMS molar ratio of each polyorganosiloxane composition and adhesive strength in Experiment 18.

FIG. 24 shows a relationship between AlsB/PDMS molar ratio of each polyorganosiloxane composition and adhesive strength.

As shown in FIG. 24, the cured product showed the highest adhesive strength when the polyorganosiloxane composition having an AlsB/PDMS molar ratio of 2 was used.

3. Silanol-Terminated Polydimethylsiloxane-Tin Alkoxide System

Experiment 19: Investigation of Adhesive Strength of Products Prepared Using Different Kinds of Tin Compounds In a glove box through which dry nitrogen gas flowed in and out, a silanol-terminated polydimethylsiloxane (manufactured by Gelest, Inc., hereinafter referred to as "PDMS") having an Mw of 590 when actually measured by GPC (nominal Mw: 400 to 700, hereinafter referred to as Mw=590); a tin compound at a molar ratio PDMS:tin compound of 1:2; and a stirrer chip were introduced into a glass container having a lid (capacity: 50 mL, a vial with screw), followed by stirring with a magnetic stirrer in an incubator maintained at 25° C. Tin tetra-t-butoxide (SntB, manufactured by Sigma-Aldrich) was used as the tin compound, and, for comparison, organic tin (di-n-butyl-tin-dilaurate: DBTDL, manufactured by Gelest, Inc.) and a tin salt (tin di-2-ethyl hexanoate: TDEH, manufactured by Sigma-Aldrich) were used. The stirring was performed at a stirring rate of 550 rpm for 24 hours. Other conditions were basically the same as those in Experiment 1.

The curing was performed by increasing the temperature to 80° C. at a heating rate of 10° C./min, keeping 80° C. for 6 hours, increasing the temperature to 105° C. at the same heating rate as above, keeping 105° C. for 12 hours, increasing the temperature to 180° C. at the same heating rate as above, and keeping 180° C. for 12 hours, followed by natural cooling. After cooling, the test piece was fixed at both ends (end regions each having a width of 25 mm and a length of 50 mm) and was stretched at a tension rate of 5 mm/min in opposite directions using an RTC Tensilon universal tester, RTC250A, manufactured by A&D Co., in accordance with JIS K6251. Hereinafter, the tension rate in the subsequent evaluation of adhesion performance was set to this rate.

Figure 25:
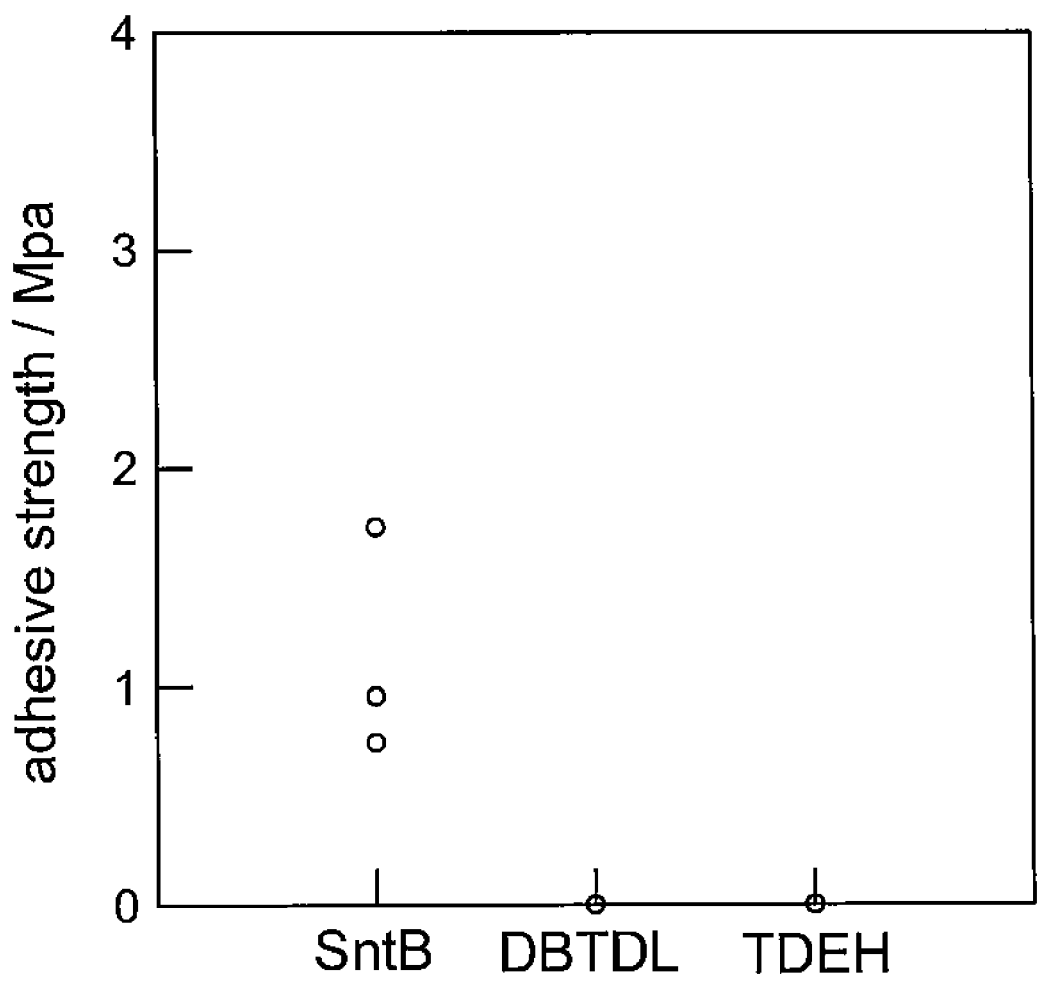
FIG. 25 shows the adhesive strength of each cured product used various different types of tin compounds in Experiment 19.

FIG. 25 shows the adhesive strength of each cured product used various tin compounds.

As shown in FIG. 25, the cured product prepared using a tin alkoxide as the tin compound was excellent in adhesive strength compared with those prepared using an organic tin or a tin salt and had strength of 1.14 MPa in the average of three test pieces. In the cases of using the organic tin or the tin salt, since the drying and curing were insufficient after the firing, adhesion did hardly occur. It is conceivable that the material to be mixed with PDMS needs to be an alkoxide.

INDUSTRIAL APPLICABILITY

The polyorganosiloxane composition according to the present invention can be used as, for example, a low-temperature curable silicone adhesive or a sealing agent.

The invention claimed is:

1. A polyorganosiloxane composition comprising:
(A) a polyorganosiloxane in which at least one end of each molecule is modified with a silanol; and
(B) a metal alkoxide in an amount of 0.5 to 4.0 moles relative to one mole of the polyorganosiloxane,
wherein the polyorganosiloxane has a mass-average molecular weight (Mw) of 1000 or less.

2. The polyorganosiloxane composition according to claim 1, having an M-O—Si bond connecting between a metal (M) atom of the metal alkoxide and a silicon (Si) atom with an oxygen atom.

3. The polyorganosiloxane composition according to claim 1, wherein the metal alkoxide is a titanium alkoxide or an aluminum alkoxide.

4. The polyorganosiloxane composition according to claim 3, wherein the titanium alkoxide is titanium tetrapropoxide or titanium tetrabutoxide.

5. The polyorganosiloxane composition according to claim 3, wherein the aluminum alkoxide is aluminum tributoxide or aluminum triethoxide.

6. The polyorganosiloxane composition according to claim 3, wherein the molar ratio of the metal alkoxide to the polyorganosiloxane is 0.5 to 3.0.

7. The polyorganosiloxane composition according to claim 6, wherein the molar ratio of the metal alkoxide to the polyorganosiloxane is 1.0 to 2.0.

8. A polyorganosiloxane cured product, being a cured product of a polyorganosiloxane composition according to claim 1.

9. A method for producing a polyorganosiloxane composition, comprising mixing a polyorganosiloxane in which at least one end of each molecule is modified with a silanol and having a mass-average molecular weight (Mw) of 1000 or less and a metal alkoxide in an amount of 0.5 to 4.0 moles relative to one mole of the polyorganosiloxane to produce a polyorganosiloxane composition.

10. The method for producing a polyorganosiloxane composition according to claim 9, comprising the step of stirring the polyorganosiloxane and the metal alkoxide within a range in which the composition has an M-O—Si bond connecting between a metal (M) atom of the metal alkoxide and a silicon (Si) atom with an oxygen atom.

* * * * *

UNITED STATES PATENT AND TRADEMARK OFFICE
CERTIFICATE OF CORRECTION

PATENT NO. : 8,440,848 B2  Page 1 of 1
APPLICATION NO. : 13/128509
DATED : May 14, 2013
INVENTOR(S) : Murakami et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 269 days.

Signed and Sealed this
Eighth Day of September, 2015

Michelle K. Lee
*Director of the United States Patent and Trademark Office*